United States Patent
Hamada et al.

(10) Patent No.: US 9,421,657 B2
(45) Date of Patent: Aug. 23, 2016

(54) MACHINING CONTROL APPARATUS AND MACHINING CONTROL METHOD THEREOF

(75) Inventors: Kenji Hamada, Kariya (JP); Shinji Murakami, Toyota (JP); Yoshihiko Yamada, Anjo (JP)

(73) Assignee: JTEKT Corporation, Osaka-shi (JP)

( * ) Notice: Subject to any disclaimer, the term of this patent is extended or adjusted under 35 U.S.C. 154(b) by 604 days.

(21) Appl. No.: 13/995,827

(22) PCT Filed: Sep. 14, 2011

(86) PCT No.: PCT/JP2011/071040
§ 371 (c)(1),
(2), (4) Date: Jun. 19, 2013

(87) PCT Pub. No.: WO2013/038532
PCT Pub. Date: Mar. 21, 2013

(65) Prior Publication Data
US 2013/0272812 A1     Oct. 17, 2013

(51) Int. Cl.
*B23Q 15/08*     (2006.01)
*B23Q 15/12*     (2006.01)
(Continued)

(52) U.S. Cl.
CPC ............... *B23Q 15/08* (2013.01); *B23Q 15/12* (2013.01); *B23Q 17/12* (2013.01); *G05B 19/404* (2013.01);
(Continued)

(58) Field of Classification Search
CPC .... B23Q 15/08; B23Q 15/12; B23Q 17/0976; B23Q 17/12; G05B 19/404; G05B 19/416; G05B 2219/42344; G05B 2219/49074; G05B 2219/49357; Y10T 409/30112; Y10T 409/302968

USPC ................ 700/173, 174; 409/141; 702/56
See application file for complete search history.

(56) References Cited

U.S. PATENT DOCUMENTS 5,461,273 A * 10/1995 Kawasaki ............... H02N 2/14
                                                       310/316.02
6,662,073 B1    12/2003   Fujishima et al.
(Continued)

FOREIGN PATENT DOCUMENTS

CN           1349877 A     5/2002
CN       101722438 A     6/2010
(Continued)

OTHER PUBLICATIONS

Extended European Search Report issued Dec. 10, 2013 in Patent Application No. 11872425.1.
(Continued)

*Primary Examiner* — Robert Fennema
*Assistant Examiner* — Jennifer L Norton
(74) *Attorney, Agent, or Firm* — Oblon, McClelland, Maier & Neustadt, L.L.P

(57) ABSTRACT

The present invention discloses a machining control apparatus capable of decreasing a machining error, comprising: a rotation velocity decision process part for deciding a rotation velocity of the rotation tool in such a way that an amplitude of vibration of the rotation tool is decreased, based on a vibration state of the rotation tool and a vibration phase of the rotation tool when the rotation tool receives the cutting resistance force, in the case that the rotation tool vibrates due to the interrupted cutting resistance force generated in the rotation tool during the interrupted cutting; and a rotation velocity control part for controlling the rotation velocity(S) of the rotation tool based on the rotation velocity decided.

6 Claims, 14 Drawing Sheets

(51) Int. Cl.
*B23Q 17/09* (2006.01)
*B23Q 17/12* (2006.01)
*G05B 19/04* (2006.01)
*G05B 19/416* (2006.01)
*G05B 19/404* (2006.01)

(52) U.S. Cl.
CPC .............. *G05B 19/416* (2013.01); *B23Q 17/09* (2013.01); *G05B 2219/42344* (2013.01); *G05B 2219/49074* (2013.01); *G05B 2219/49357* (2013.01); *Y10T 409/30112* (2015.01); *Y10T 409/302968* (2015.01)

(56) References Cited

U.S. PATENT DOCUMENTS

| | | | |
|---|---|---|---|
| 2005/0082993 A1* | 4/2005 | Morishita | G05D 19/02 318/114 |
| 2007/0201956 A1 | 8/2007 | Onozuka et al. | |
| 2010/0104388 A1 | 4/2010 | Suzuki et al. | |
| 2013/0268110 A1* | 10/2013 | Hamada | G05B 19/404 700/192 |
| 2013/0309034 A1* | 11/2013 | Inagaki | B23Q 17/0976 409/132 |
| 2014/0229021 A1* | 8/2014 | Yoshitake | F16F 7/1011 700/280 |
| 2015/0030405 A1* | 1/2015 | Tsuruta | B23Q 11/04 409/80 |

FOREIGN PATENT DOCUMENTS

| | | |
|---|---|---|
| EP | 1 296 210 A1 | 3/2003 |
| JP | 9 047941 | 2/1997 |
| JP | 2007 44852 | 2/2007 |
| JP | 2007-167980 A | 7/2007 |
| JP | 2010 105073 | 5/2010 |

OTHER PUBLICATIONS

Combined Chinese Office Action and Search Report issued Mar. 18, 2014, in Chinese Patent Application No. 201180068311.6 with English translation of category of cited documents.
International Search Report Issued Dec. 13, 2011 in PCT/JP11/071040 Filed Sep. 14, 2011.
U.S. Appl. No. 13/994,961, filed Jun. 17, 2013, Hamada.

* cited by examiner (a) t1    (b) t2    (c) t3

(d) t4    (e) t5

(a)

(b)

MACHINING CONTROL APPARATUS AND MACHINING CONTROL METHOD THEREOF

TECHNICAL FIELD

The present invention relates to a machining control apparatus for an interrupted cutting of the workpiece carried out by a rotation tool, and to a machining control method thereof.

BACKGROUND ART

Japanese Unexamined Patent Application Publication No. H9-47941 describes such a technology, wherein in the case of cutting by a ball-end mill, the feeding speed is controlled in consideration of the displacement amount of tools varying dependent on rigidity of the tools generated due to increasing of machining load.

SUMMARY OF THE INVENTION

Problem to be Solved by the Invention

Here, the cutting using the rotation tool such as a ball-end mill and the like is an interrupted cutting. In this case, an interrupted cutting resistance force is generated in the rotation tool. The present inventors have researched continually how the interrupted cutting resistance force influences a machining error.

The present invention is made in view of that case, and an object of the present invention is to provide a machining control apparatus and a machining control method thereof which are capable of decreasing a machining error.

Measures to Solve the Problem (Machining Control Apparatus)

(1) A machining control apparatus according to the present invention, is a machining control apparatus for an interrupted cutting, said interrupted cutting using a rotation tool which is provided with one or more of cutting-edge portions in the circumferential direction on the peripheral circumference thereof, being carried out in such a way that the rotation tool is rotated around its axis while moved relatively with respect to a workpiece, wherein the machining control apparatus comprising: a rotation velocity decision process unit configured to decide a rotation velocity of the rotation tool in such a way that an amplitude of vibration of the rotation tool is decreased, based on a vibration state of the rotation tool and a vibration phase θ of the rotation tool when the rotation tool receives the cutting resistance force at the second time, in the case that the phase is defined to be 0° when the rotation tool receives the cutting resistance force at the first time, in the case that the rotation tool vibrates due to the interrupted cutting resistance force generated in the rotation tool during the interrupted cutting; and a rotation velocity control unit configured to control the rotation velocity of the rotation tool based on the rotation velocity decided.

The present inventors find out the relationship between the interrupted cutting resistance force generated in the interrupted cutting and the rotation velocity of the rotation tool, and invent a machining control apparatus capable of deciding a rotation velocity which can decrease an amplitude of the rotation tool. According to the present invention, through controlling the rotation velocity of the rotation tool in such a way that the interrupted cutting resistance force reduces the amplitude of the rotation tool, the occurrence of the machining error per se can be minimized. In addition, through reducing the amplitude of the rotation tool, the chattering vibration can be prevented from producing.

(2) Further, the rotation velocity decision process unit may be configured to decide the rotation velocity based on the absolute tool-edge position of the cutting-edge portion with respect to the workpiece.

The location of the rotation tool for forming the machined shape of the workpiece is a tool edge of the cutting-edge. Through deciding the rotation velocity based on the absolute tool-edge position of the cutting-edge, the error of the absolute tool-edge position can be decreased, and thus the machining error can be decreased.

(3) Further, the rotation velocity decision process unit may be configured to decide the rotation velocity in such a way that the maximum amplitude of vibration of the rotation tool becomes equal to or below a set threshold.

If the maximum amplitude of vibration of the rotation tool becomes bigger, there is a risk of the rotation tool broken. Therefore, through deciding the rotation velocity in such a way that the maximum amplitude of vibration of the rotation tool becomes equal to or below a set threshold, the breaking of the rotation tool can be prevented reliably, and the machining error can be reduced.

(4) Further, the vibration phase is defined as 0° when the rotation tool receives the cutting resistance force at the first time, the rotation velocity decision process unit may be configured to decide the rotation velocity in such a way that when the rotation tool receives the cutting resistance force at the second time, the vibration phase of the rotation tool is equal to or greater than 180° and less than 270°.

Through the vibration phase of the rotation tool being equal to or greater than 180° and less than 270° when the rotation tool receives the cutting resistance force at the second time, the cutting resistance force acts on the direction inhibiting the vibration. Thereby, the amplitude of the rotation tool can be further decreased. In addition, at other vibration phases, there exists a diverging state due to increasing of the displacement amount of the rotation tool or a state (an idle state) in which the cutting edge portion which should have cut does not cut, which is risky.

(5) Further, the machining control apparatus can further comprise an amplitude detection unit configured to detect the amplitude of the rotation tool; and a rotation velocity correction unit configured to correct the rotation velocity in such a way that the amplitude becomes equal to or below a set threshold, in case that the amplitude of the rotation tool detected by the amplitude detection unit may be configured to exceed the set threshold.

Even if the vibration state has changed for various reasons in machining, through monitoring the amplitude of vibration in machining, the amplitude of vibration of the rotation tool can be decreased reliably. As a result, the machining error can be reduced.

(Machining Control Method)

(6) Further, a machining control method according to the present invention is a machining control method for an interrupted cutting, said interrupted cutting using a rotation tool which is provided with one or more of cutting-edge portions in the circumferential direction on the peripheral circumference thereof, being carried out in such a way that the rotation tool is rotated around its axis while moved relatively with respect to a workpiece, wherein the machining control method comprising: a rotation velocity decision step for deciding a rotation velocity of the rotation tool in such a way that an amplitude of vibration of the rotation tool is decreased, based on a vibration state of the rotation tool and a vibration phase θ of the rotation tool when the rotation tool receives the cutting resistance force at the second time, in the case that the phase is defined to be 0° when the rotation tool receives the cutting resistance force at the first time, in the case that the rotation tool vibrates due to the interrupted cutting resistance force generated in the rotation tool during the interrupted cutting; and a rotation velocity control step for controlling the rotation velocity of the rotation tool based on the rotation velocity decided.

The machining control method according to the present invention, like the above machining control method, can minimize the occurrence of the machining error per se.

BRIEF DESCRIPTION OF DRAWINGS

FIG. 6(a) represents a relative tool-edge position of a cutting-edge portion of the rotation tool with respect to a rotation phase of the rotation tool, FIG. 6(b) represents a displacement amount of the rotation center of the rotation tool with respect to the rotation phase, and FIG. 6(c) represents the absolute tool-edge position of the cutting-edge portion of the rotation tool with respect to the rotation phase;

FORMS FOR PRACTICING THE INVENTION

1. Summary of Machining System

Hereafter, a summary of a machining system will be described. The object of the machining system is directed to reduce the machining error as much as possible in the case that the workpiece W is cut by the rotation tool. As a specific method thereof, the following operations are performed.

(a1)) calculating high-precisely an estimated value of the cutting resistance force through simulation;

(a2) making a correction in controlling the machine tool so as to decrease the machining error using the estimated value of the cutting resistance force calculated;

(b1) calculating high-precisely an estimated value of the machining error through simulation;

(b2) determining machining conditions (in particular the rotation velocity of the rotation tool) for decreasing the machining error by using the estimated value of the machining error calculated, and in turn, making NC data according to the machining conditions;

(b3) making a correction in controlling the machine tool so as to decrease the machining error by using the estimated value of the machining error calculated;

(c1) calculating high-precisely an estimated value of a tool wear amount through simulation;

(c2) making a correction in controlling the machine tool so as to decrease the machining error by using the estimated value of the tool wear amount.

That is, the machining system functions as the following apparatuses: a machining simulation apparatus to calculate the estimated value of the cutting resistance force and the estimated value of the tool wear amount through simulation; a machining error calculation apparatus to calculate the estimated value of the machining error; and a machining control apparatus to control the machine tool in considering the estimated value of the cutting resistance force, the estimated value of the machining error and the estimated value of the tool wear amount. Here, the machining simulation apparatus, the machining error calculation apparatus and the machining control apparatus do not respectively function independently, but function to be correlated to one another.

2. Configuration of the Objective Machine Tool

Figure 1:
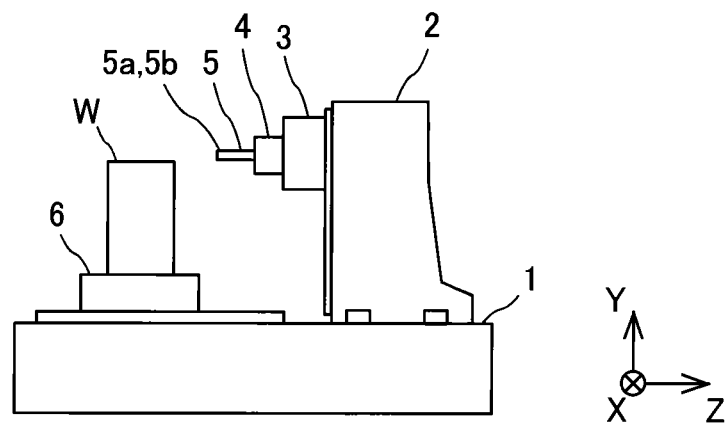
FIG. 1 is a structural view representing a machine tool as an applicable object of a machining system according to an embodiment of the present invention.

The configuration of the machine tool as an applicable object of the machining system will be described. The objective machine tool is defined as a machine tool which cuts a workpiece W by a rotation tool. As an example of such a machine tool, a horizontal machining center will be described with reference to FIG. 1. As shown in FIG. 1, the machine tool includes a base 1, a column 2 arranged on the base 1 and movable in a X-axis direction, a saddle 3 arranged in front of (i.e. the left in FIG. 1) the column 2 and movable in a Y-axis direction, a rotation spindle 4 supported rotatably by the saddle 3 and holding a rotation tool 5, and a table 6 arranged on the base 1 and movable in a Z-axis direction, on which a workpiece W is placed.

Here, the rotation tool 5 is provided with one or more of cutting-edge portions 5a, 5b in the circumferential direction on the peripheral circumference. The rotation tool 5 includes, but not limited to, for example, a ball-end mill, a square-end mill, a milling cutter and the like. That is, the machine tool performs an interrupted cutting in such a way that the rotation tool 5 is rotated about its axis while moving relatively to the workpiece W. Also, though it is not illustrated, the machine tool comprises a motor for moving the column 2 and the saddle 3 as well as the table 6, a nozzle for supplying coolant, or a coolant pump.

3. Occurrence Mechanism of the Machining Error

Next, the occurrence mechanism of the machining error will be described with reference to FIGS. 2-6. The term "machining error" is defined as a difference between an actual machined shape of the workpiece W and an objective machined shape of the same.

Figure 2:
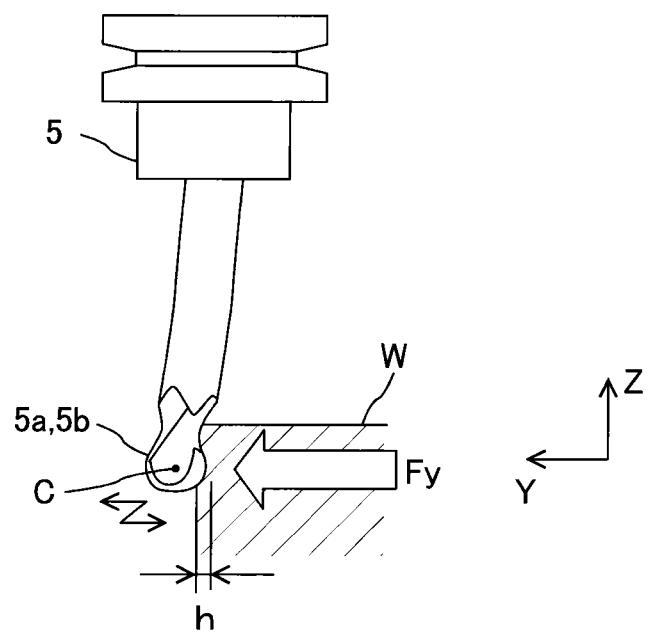
FIG. 2 is a view for illustrating the occurrence mechanism of the machining error, and showing a state in which a rotation tool is deforming.

As shown in FIG. 2, due to the deformation of the rotation tool 5, in the section including Z-axis, the coordinates of the rotation center of the rotation tool 5 deviates from the commanding coordinates thereof, which is one of the reasons causing the machining error. The Z-axis direction is defined as the direction of the rotation axis of the rotation spindle 4. In particular, in the case of the rotation tool 5 with a large L/D(=length/diameter) (i.e. an elongated rotation tool), due to the low rigidity of said rotation tool 5, the front end side of the rotation tool 5 is prone to bend by the cutting resistance force Fy. Here, the rotation tool 5 is provided with one or more of cutting-edge portions 5a, 5b in the circumferential direction on the peripheral circumference of the front end. That is, the rotation center C of the front end side (the location of the cutting-edge portions 5a, 5b) of the rotation tool 5 is displaced by the cutting resistance force Fy, so that the machined shape of the workpiece W is changed. As a result, the machining error occurs. Here, the term "rotation center C" is defined as a rotation center of respective sections of the rotation tool 5 in its axis direction (the direction of the rotation axis of the rotation spindle 4) in the state of the rotation tool 5 undeformed, that is, the rotation center of respective sections in the Z-axis direction of the rotation tool 5. For the purpose of understanding easily, the rotation center C will be explained as one rotation center in a certain Z-axis coordinate as below.

Here, if the cutting resistance force Fy generated in the rotation tool 5 is constant, the amount of bending of the front end side of the rotation tool 5 is also constant. Nevertheless, during the interrupted cutting carried out by the rotation tool 5, the cutting resistance force Fy generated in the rotation tool 5 varies each time. Thus, the displacement amount of the rotation center C of the front end side of the rotation tool 5 varies each time mainly in the Y direction. At this point, the displacement amount of the rotation center C of the front end side of the rotation tool 5 and the cutting resistance force Fy depend on dynamic properties of the rotation tool 5. The term "dynamic properties of the tool" is referred to a variation of a deformation with respect to the force input, and is represented through a transfer function (a compliance and a phase lag) or thereby calculated mass (M), viscosity attenuation coefficient (C), elastic constant (K), resonance frequency ($\omega$), and attenuation ratio ($\zeta$) and the like. The reciprocation arrow in FIG. 2 represents the rotation center C of the front end side of the rotation tool 5 reciprocates mainly in the Y direction.

Figure 3:
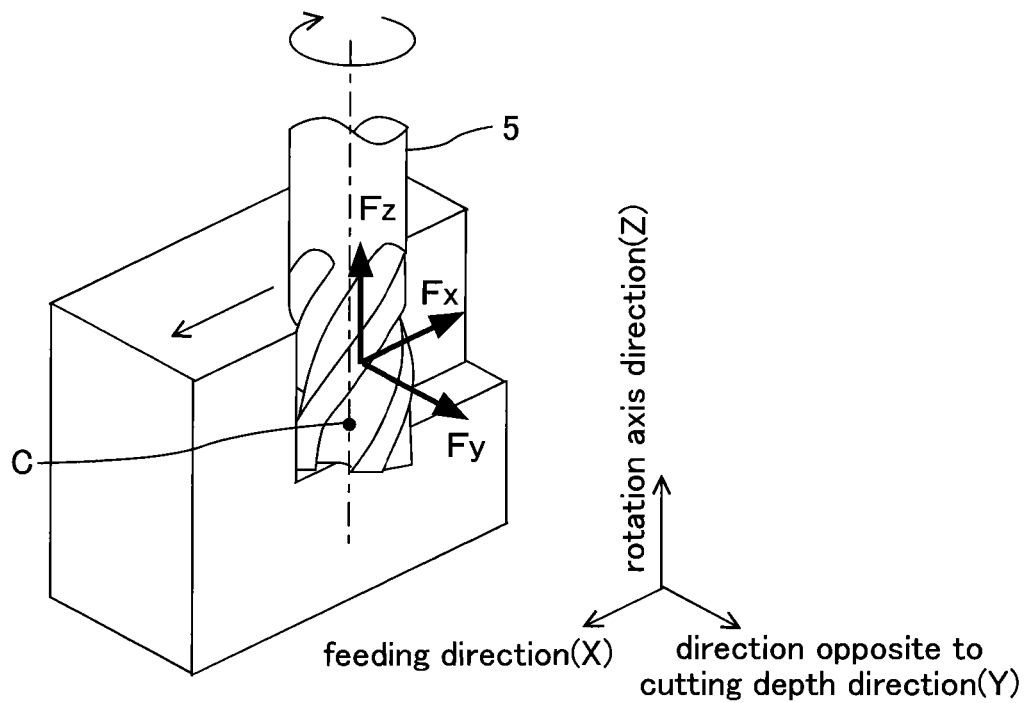
FIG. 3 is a view for illustrating the occurrence mechanism of the machining error, and showing cutting resistance forces generated in the rotation tool.

In FIG. 2, the machining error caused by the cutting resistance force Fy of the Y direction is described. However, in fact, as shown in FIG. 3, in the rotation tool 5, there are cases to generate a cutting resistance force Fx in the direction opposite to the feeding direction and a cutting resistance force Fz in the axis direction, in addition to a case to generate the cutting resistance force Fy in the direction opposite to the cutting depth direction. That is, the rotation center C of the front end side of the rotation tool 5 is displaced in the direction of the resultant resistance force Fxyz of the cutting resistance forces Fx, Fy and Fz in respective directions. Furthermore, FIG. 3 illustrates a square-end mill, yet the same situation is also applied to the ball-end mill in FIG. 2.

Figure 4:
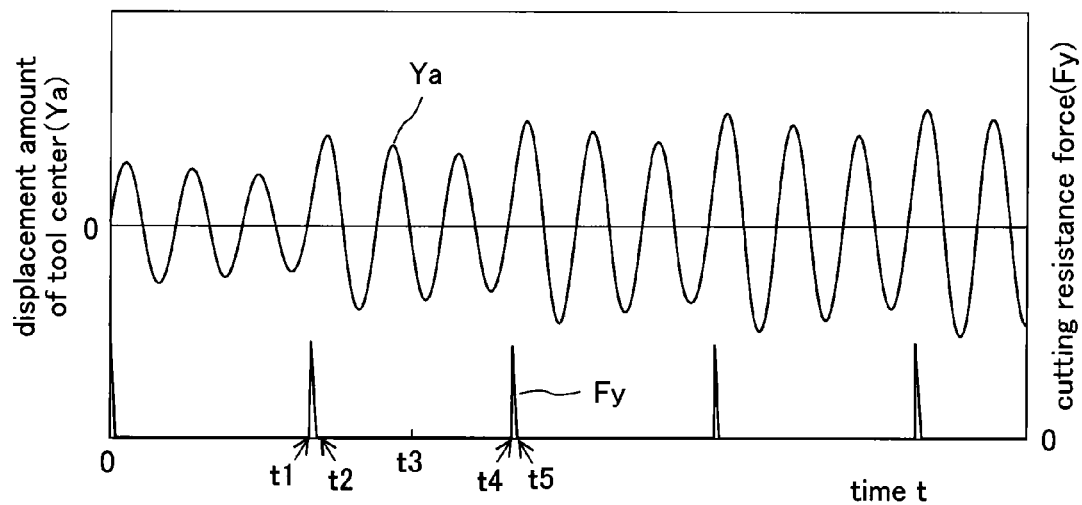
FIG. 4 is a view for illustrating the occurrence mechanism of the machining error, and showing the variation of the cutting resistance forces generated in the rotation tool versus the elapsed time and the variation of displacement amount of the rotation center of the rotation tool versus the elapsed time.
Figure 5:
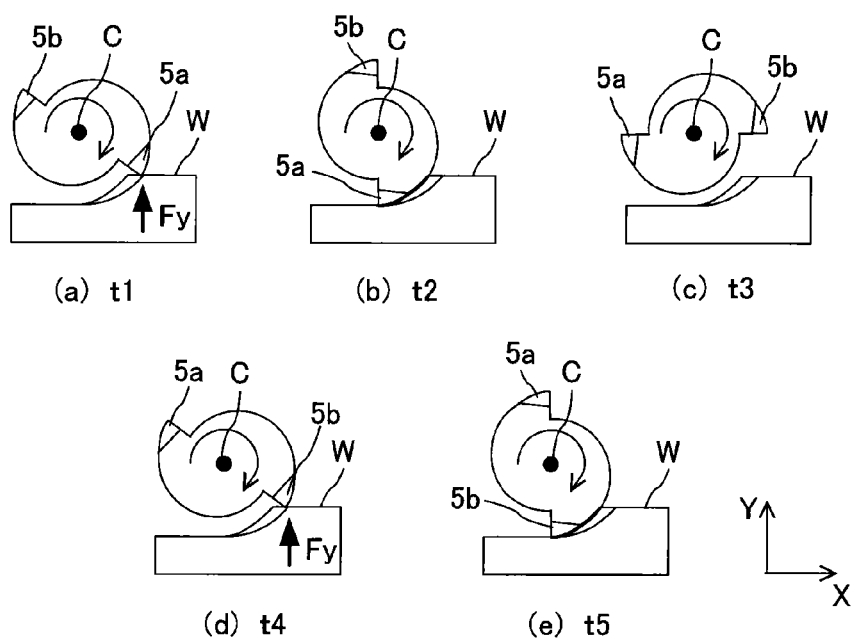
FIG. 5 is a view for illustrating the occurrence mechanism of the machining error, and showing the position relationship between the rotation tool and a workpiece at each time of FIG. 4.
Figure 6:
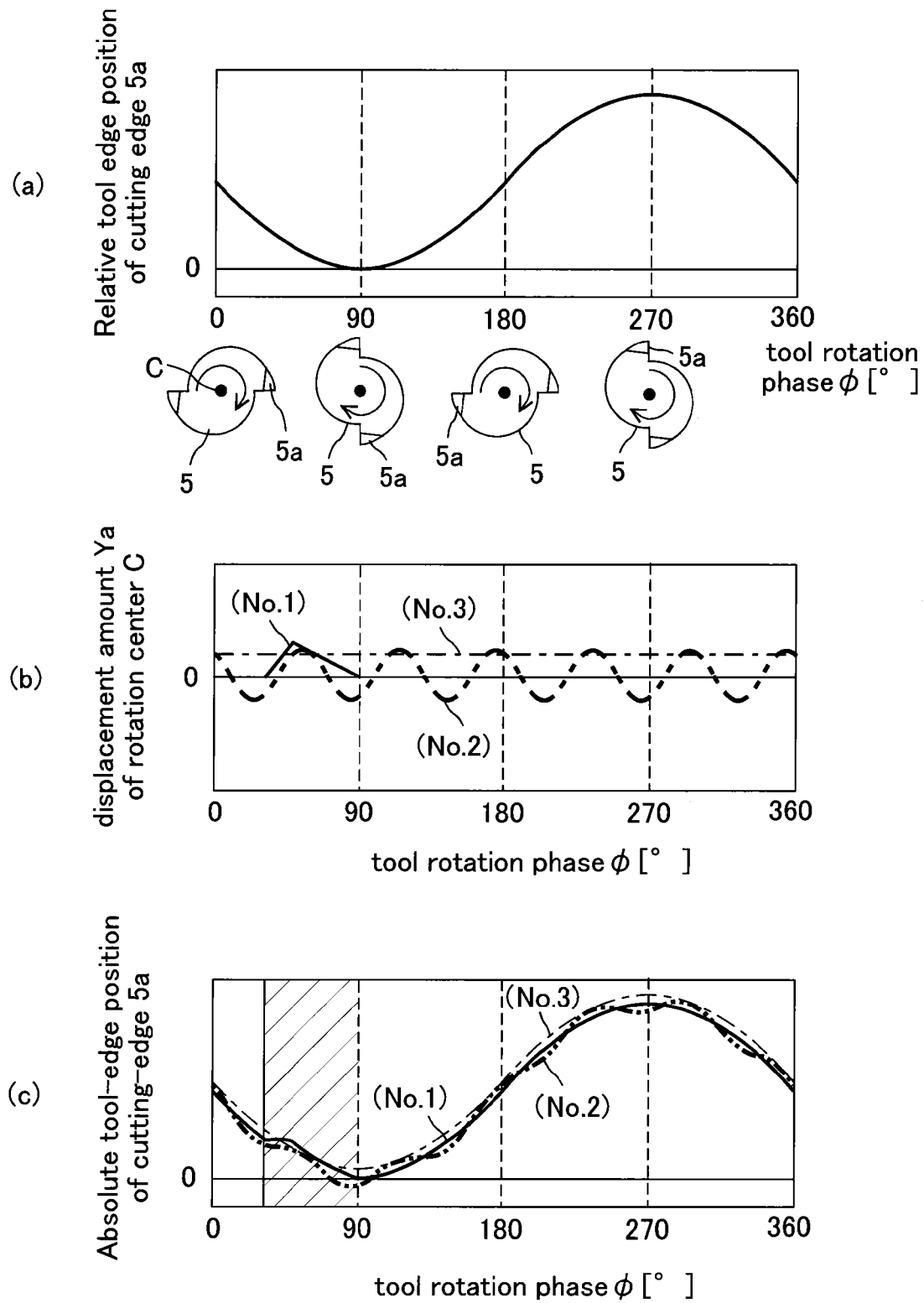
FIG. 6 is a view for illustrating the occurrence mechanism of the machining error, and showing the relationship between the displacement amount of the rotation center of the rotation tool and the machining error, where
Figure 7:
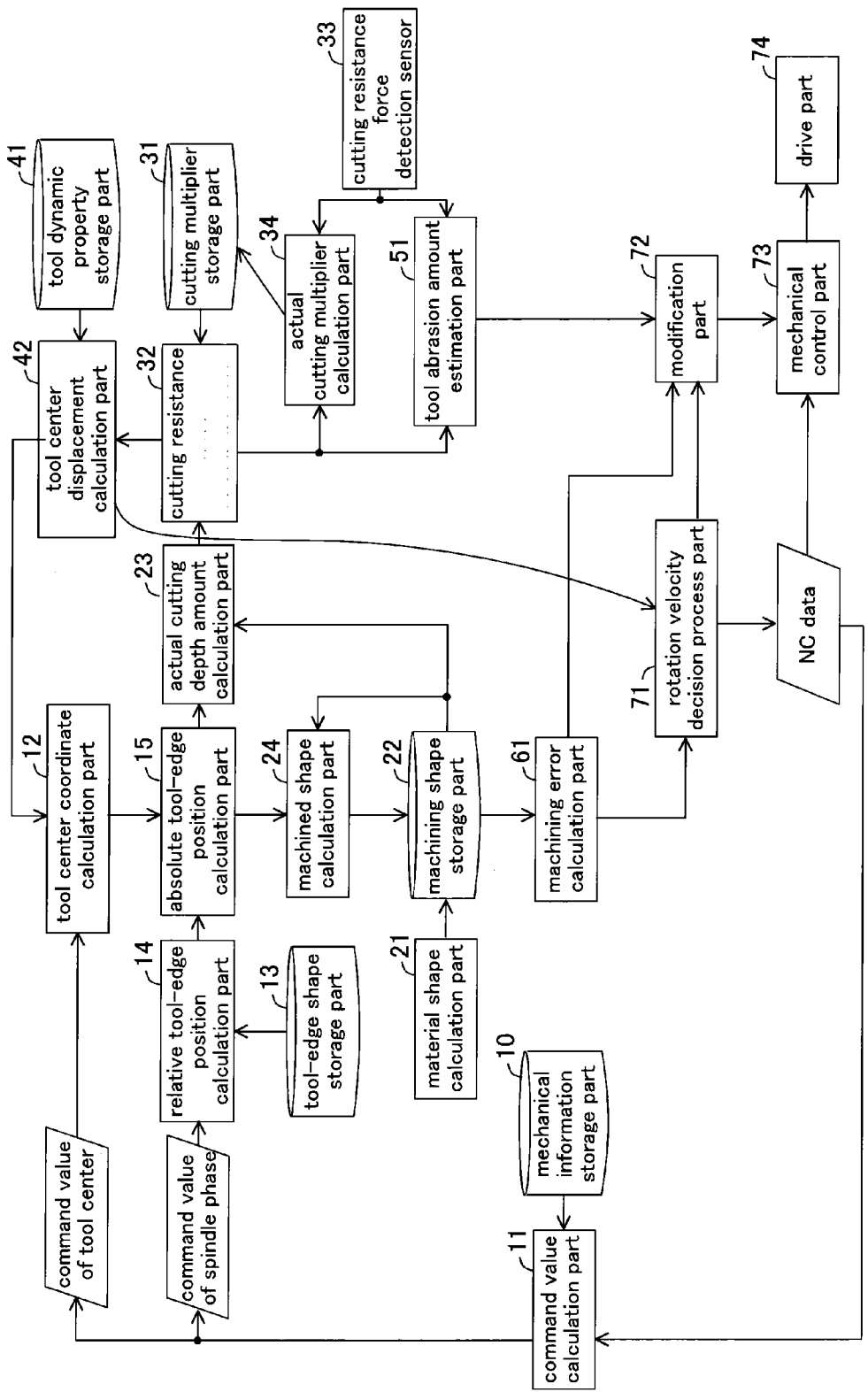
FIG. 7 is a detailed functional block diagram of the machining system according to the embodiment of the present invention.

Next, with reference to FIGS. 4 and 5, when the rotation tool 5 is interruptedly cutting the workpiece W while the rotation tool 5 is fed and rotated, the variation of the cutting resistance forces F generated in the rotation tool 5 versus the elapsed time t and the variation of displacement amount Ya of the rotation center C of the front end side of the rotation tool 5 versus the elapsed time t will be illustrated. Here, the cutting resistance force Fy in the direction (Y direction) opposite to the cutting depth direction and the displacement amount Ya of the rotation center C of the front end side will be described by example. This is because the direction (Y direction) opposite to the cutting depth direction has the greatest influence on the machining error.

With reference to FIG. 4 and FIGS. 5(a)-5(e), the variation of the cutting resistance force Fy versus the elapsed time t will be illustrated. As shown in FIG. 4, the cutting resistance force Fy is varied from about zero to a larger value at time t1, and is varied again to about zero at time t2. FIGS. 5(a) and 5(b) correspond respectively to times t1 and t2 in FIG. 4. As shown in FIG. 5(a), the time t1 is the moment when the cutting-edge portion 5a at one side comes to contact with the workpiece W. That is, the time t1 is the moment when the cutting is started by said cutting-edge portion 5a at one side. On the other hand, as shown in FIG. 5(b), the time t2 is the moment when the cutting of the workpiece W carried out by said cutting-edge portion 5a at one side is ended. As described above, during the period of t1-t2, said cutting-edge portion 5a at one side is cutting.

Subsequently, as shown in FIG. 4, during the period of t2-t4, the cutting resistance force Fy is close to about zero. During this period, as shown in FIG. 5(c) corresponding to time t3, neither of the cutting-edges portions 5a and 5b at both sides contacts with the workpiece W. That is, the rotation tool 5 is idling.

Thereafter, as shown in FIG. 4, the cutting resistance force Fy is again varied to a larger value at time t4, and is again varied to about zero at time t5. At time t4 in FIG. 4, as shown in the corresponding FIG. 5(d), the cutting-edge portion 5b at the other side comes to contact with the workpiece W. That is, the cutting is started through said cutting-edge portion 5b at the other side. In addition, at the time t5 in FIG. 4, as shown in the corresponding FIG. 5(e), the cutting carried out by said cutting-edge portion 5b at the other side is ended. As described above, during the period of t4-t5, said cutting-edge portion 5b at the other side is cutting.

Here, it is known from the cutting region of the present time of FIGS. 5(a)-5(e), at respective moments of t1-t2 and t4-t5, the actual cutting depth amount (the cutting depth amount of the moment) is different respectively. That is, the actual cutting depth amount becomes much suddenly from the start of cutting, and gradually becomes small after reaching a peak value. In more detail, change takes place in front and behind of the interface between a part uncut at the previous time and the part cut at the previous time. In addition, as indicated by the sharply-increasing portion in FIG. 4, it is known that the cutting resistance force Fy in cutting is in a form of a substantial triangle, and varies according to the actual cutting depth amount.

In addition, the machine tool 5 starting to cut at times t1, t4 is referred to, in other words, starts to collide with the workpiece W. That is, at the moment when the rotation tool 5 changes from the idle state into the state of starting to cut, the interrupted cutting resistance force occurs in the rotation tool 5 due to the collision with the workpiece W.

That is, owing to the change of the cutting resistance force Fy during the cutting, the rotation center C of the front end side of the rotation tool 5 generates an acceleration at least in the direction (Y direction) opposite to the cutting depth direction. Furthermore, being the interrupted cutting, the rotation center C of the front end side of the rotation tool 5 vibrates at least in the direction (Y direction) opposite to the cutting depth direction, due to the cutting resistance force Fy (like an impact force) during the cutting.

Thereby, the displacement amount Ya of the rotation center C of the front end side of the rotation tool 5 fluctuates in accordance with the characteristic value of the rotation tool 5, as shown in FIG. 4. In particular, immediately after the cutting resistance force Fy occurs during cutting, the displacement amount Ya of the rotation center C becomes the largest, and subsequently attenuates. Then, the displacement amount Ya again becomes larger due to the cutting resistance force Fy, and so repeats.

Next, with reference to FIGS. 6(a)-6(c), how the displacement amount Ya of the rotation center C of the front end side of the rotation tool 5 influences the machining error will be described. In FIG. 6(a), at the respective rotation phases cp of the rotation tool 5, the relative positions (the relative position of the tool-edge) of the tool-edge of the cutting-edge portion 5a relative to the rotation center C of the front end side of the rotation tool 5 is shown. That is, the rotation phase φ where the cutting-edge portion 5a cuts the workpiece W is in a range of 30°-90°.

In addition, three kinds of the displacement amount Ya of the rotation center C will be represented. However, these are all schematically presented, and the scaling proportion of the longitudinal axis of FIG. 6(b) is different from that of FIG. 6(a). A first (No. 1) displacement amount Ya is regarded as the variation corresponding to the cutting depth amount in FIG. 4. A second (No. 2) displacement amount Ya is regarded as the change of the fluctuation in FIG. 4. A third (No. 3) displacement amount Ya is regarded as being in a case of constant.

As described above, in the cases of the first (No. 1) to the third (No. 3) displacement amount Ya, the tool-edge position of cutting-edge portions 5a (the absolute position of the tool-edge) relative to the workpiece W is shown in FIG. 6(c). That is, the absolute position of the tool-edge in FIG. 6(c) is formed in combining the variations in FIG. 6(a) into the state of respective changes in FIG. 6(b). Here, in FIG. 6(c), in the hatched range of the rotation phase φ, the cutting is carried out by the cutting-edge portion 5a. Furthermore, in the actual machining, the rotation velocity of the rotation tool 5 becomes significantly great with respect to the feeding speed of the rotation tool 5. Thereby, a majority of the cutting surface in the present cutting will be removed through the next cutting. So, in the cutting surface of the present cutting, the portion presented in the last machined shape is in vicinity to 90° of the rotation phases φ hatched in FIG. 6(c). That is, the deepest position at least in the rotation phases φ hatched is presented in the last machined shape.

In view of that, in FIG. 6(c), in the case of the first (No. 1) displacement amount Ya, the location in vicinity to 90° of the rotation phase φ of the tool becomes the deepest position, and is consistent with the objective value. Thereby, in the case of the first (No. 1) displacement amount Ya, the machining error is approximately zero. In the case of the second (No. 2) displacement amount Ya, the location slightly before the location 90° in the rotation phase φ of the tool becomes the deepest position, and does not reach the objective value. Thereby, in the case of the second (No. 2) displacement amount Ya, the machining error generated due to the excessive cutting occurs. However, according to the difference of the second (No. 2) displacement amount Ya, there is possible for a case of the machining error with a cutting remainder or a case with a zero machining error. In the case of the third (No. 3) displacement amount Ya, the location in vicinity to 90° in the rotation phase φ of the tool becomes the deepest position, and exceeds the objective value. Thereby, in the case of the third (No. 3) displacement amount Ya, the machining error generated due to a cutting remainder always occurs.

As described above, the deepest position of the absolute tool-edge position of the cutting-edge portion 5a together with the vicinity thereof forms the machined shape. That is, it is known that not only the displacement amount Ya of the rotation center C of the front end side of the rotation tool 5 but also which place the tool-edge of the cutting-edge portion 5a positions with respect to the rotation center C influence the machining error.

4. Functional Configuration of the Machining System

Next, with reference to FIGS. 7-17, the functional configuration of the machining system will be described in detail. The configuration of the machining system is shown as the functional diagrams in FIG. 7. Thereafter, the functional configuration of the machining system in FIG. 7 will be described.

A mechanical information storage part 10 stores various information about a machine tool as an applied object. The information contains control parameters such as a mechanical configuration of the machine tool, a tool-edge deceleration parameter, an upper limit of the rotation velocity of the rotation spindle 4, an upper limit of the moving velocity of the respective feeding axes. A command value calculation part 11 calculates a center position command value C0 of the rotation tool 5 and a phase command value of the rotation spindle 4 according to the NC data premade and the mechanical information stored in the mechanical information storage part 10. The center position command value C0 of the rotation tool 5 is denoted to be in the mechanical coordinate system.

Figure 8:
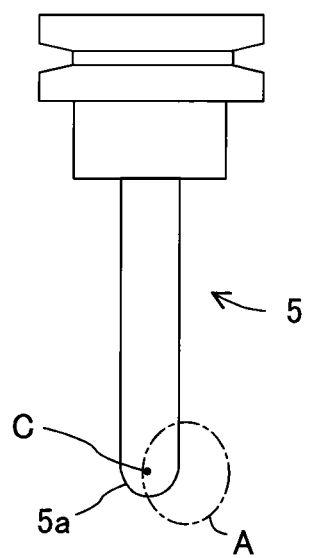
FIG. 8 is a view relevant to the tool-edge shape stored in a tool-edge shape storage part of FIG. 7.
Figure 9:
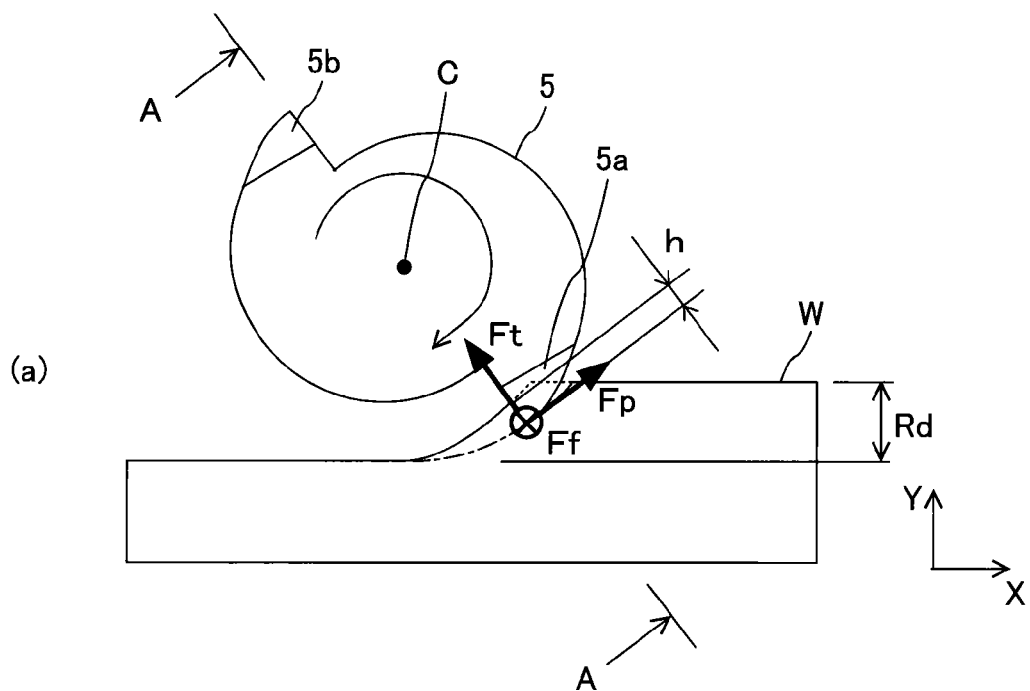
FIG. 9 is a view for illustrating an actual cutting depth amount h and a cutting length b.
Figure 9:
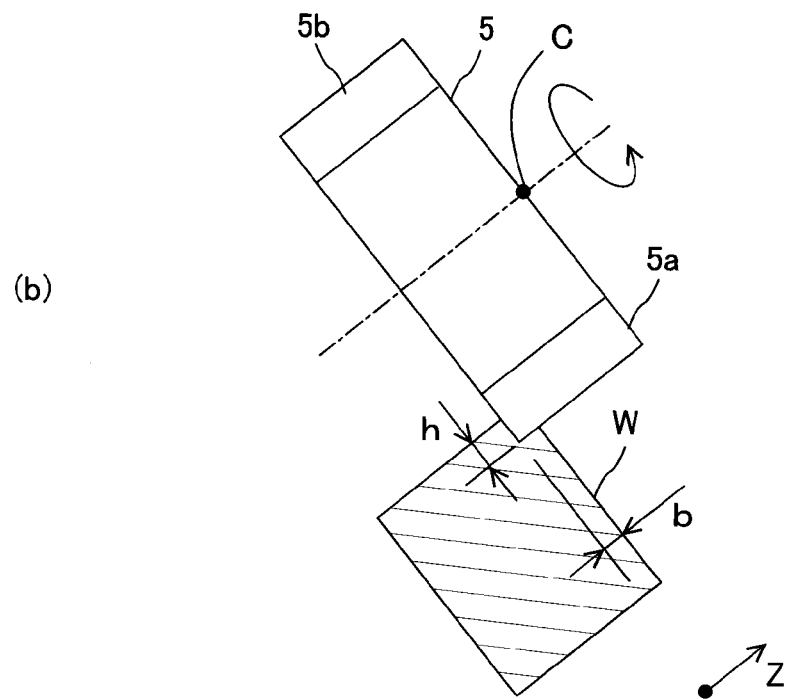
Figure 10:
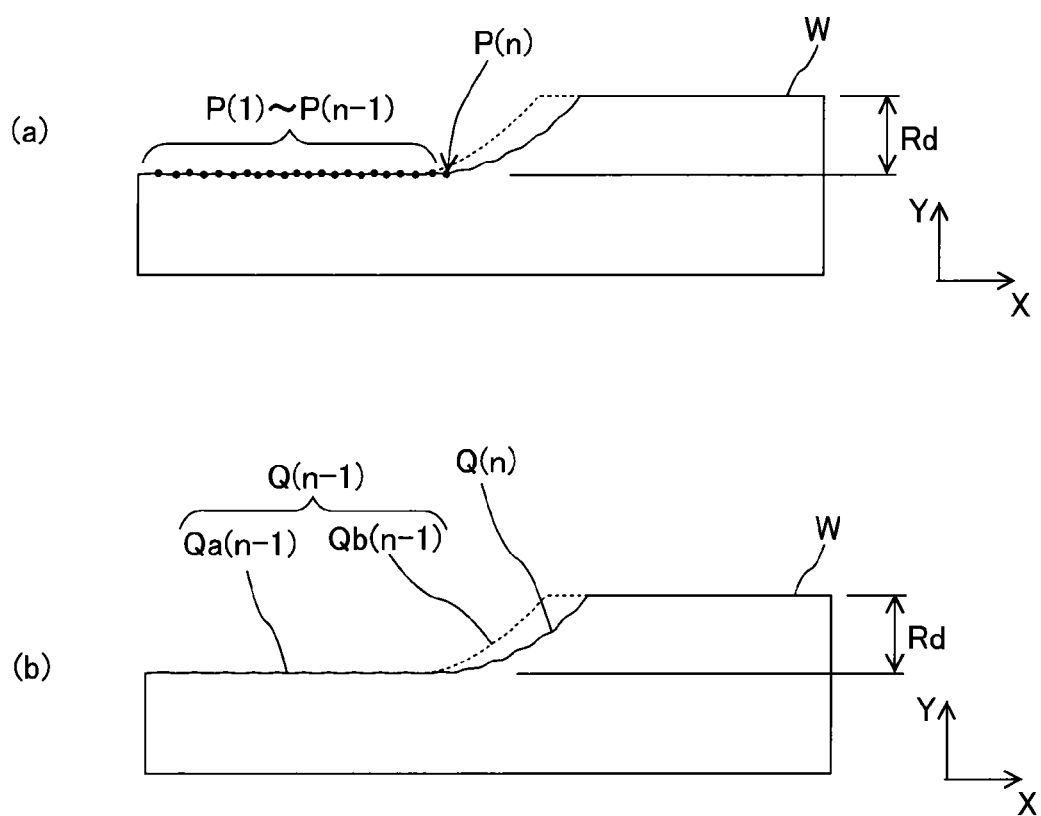
FIG. 10(a) shows a view relevant to a first machined shape calculated by the machined shape calculation part of FIG. 7
FIG. 10(b) shows a view relevant to a second machined shape calculated by the machined shape calculation part of FIG. 7.

A tool center coordinate calculation part 12 calculates the coordinate of the rotation center C of the front end side of the rotation tool 5, according to the center position command value C0 of the rotation tool 5 calculated by the command value calculation part 11 and the displacement amount of the rotation center C of the front end side of the rotation tool 5 calculated by a tool center displacement amount calculation part 42. That is, in the case of the displacement amount of the rotation center C of the front end side varied due to simulating continuously, the variation thereof is reflected each time to calculate the coordinate of the displacement amount of the rotation center C of the front end side. A tool-edge shape storage part 13 stores one or more tool-edge shape of the rotation tool 5. With reference to FIG. 8, the tool-edge shape will be described. In the tool-edge shape storage part 13, for example, in the case of a ball-end mill in FIG. 8, the shape of the part surrounded by A of the cutting-edge portion 5a is stored.

A relative tool-edge position calculation part 14 calculates relative tool-edge positions of the cutting-edge portions 5a, 5b relative to the rotation center C of the front end side of the rotation tool 5. Here, the relative tool-edge position calculation part 14 calculates a relative tool-edge position according to the phase command value of the rotation spindle 4 calculated by the command value calculation part 11 and the tool-edge shapes stored in the tool-edge shape storage part 13. That is, the relative tool-edge position calculation part 14 calculates the relative tool-edge positions of the cutting-edge portions 5a, 5b, for the respective rotation phases φ of the rotation tool 5. The relative tool-edge position is such as the information shown in FIG. 6(a).

An absolute tool-edge position calculation part 15 calculates absolute tool-edge positions of the tool-edge portions 5a, 5b relative to the workpiece W based on the coordinate of the rotation center C of the front end side of the rotation tool 5 and the relative tool-edge position. The absolute tool-edge position calculation part 15 can calculate an absolute tool-edge position varying in accordance with a elapsed time t during one rotation of the rotation tool 5. The absolute tool-edge position is such as the information as shown in FIG. 6(c). In addition, in the case of the relative tool-edge positions of the tool-edge portions 5a, 5b varied due to simulating continuously, the absolute tool-edge position calculation part 15 reflects the respective variations to calculate the absolute tool-edge position.

A material shape calculation part 21 calculates a material shape of the workpiece W according to shape data made by CAD. A machined shape storage part 22 stores a material shape of the workpiece W calculated by the material shape calculation part 21, and a historical record of the machined shape of the workpiece W calculated by a machined shape calculation part 24. That is, the stored information includes not only the last machined shape but also the shapes varied sequentially of the workpiece W during the machining.

An actual cutting depth amount calculation part 23 calculates an actual cutting depth amount h carried out by the tool-edge portions 5a, 5b through simulating, during respective moments of the machining. With reference to FIG. 9(a), the actual cutting depth amount h will be described. In FIG. 9(a), the state at the moment when the rotation phase φ of the rotation tool 5 is about 45° is shown. At the moment, the radial length of the rotation tool 5 in the segment of the tool-edge portion 5a contacting with the workpiece W becomes the actual cutting depth amount h. While the rotation tool 5 rotates clockwise from the state shown in FIG. 9(a), the actual cutting depth amount h decreases gradually. In addition, in the case that the absolute tool-edge position of the cutting-edge portions 5a, 5b is varied by simulating continuously, the actual cutting depth amount calculation part 23 reflects sequentially the variation to calculate the actual cutting depth amount h. That is, the actual cutting depth amount calculation part 23 calculates the actual cutting depth amount h according to the absolute tool-edge position calculated by the absolute tool-edge position calculation part 15 and the shape of the workpiece W at the moment stored in the machined shape storage part 22. Also, in FIG. 9(a), Rd is a cutting allowance in the cutting depth direction (−Y direction).

The machined shape calculation part 24 calculates the machined shape of the workpiece W through transferring the absolute tool-edge position which is moving sequentially on the workpiece W. In addition, the machined shape of the workpiece W calculated by the machined shape calculation part 24 is stored in the machined shape storage part 22. Additionally, in the case that the absolute tool-edge position is varied due to simulating continuously, the machined shape calculation part 24 reflects the respective variations to calculate a new machined shape. Here, the machined shape calculated by the machined shape calculation part 24 can be adopted to either one of the following two kinds. As for the two, the description will be given with reference to FIGS. 10(a) and 10(b).

As the first machined shape, as shown in FIG. 10(a), the machined shape calculation part 24 picks out the deepest position P(n) of the absolute tool-edge positions in the cutting depth direction (−Y direction) in one rotation of each of the cutting-edge portions 5a, 5b of the rotation tool 5, and takes the deepest position as the machined shape of the workpiece W to calculate. And the above process is repeated. In this case, the machined shape of the workpiece W becomes such point data as the past deepest positions P(1)-P(n−1) and the deepest position P(n) of this time. Here, due to a tiny space between the adjacent deepest positions P(n−1),P(n), even if the deepest position P(n) is taken as the machined shape, the machined shape can be distinguished high-precisely.

As the second machined shape, the machined shape calculation part 24 calculates the machined shape of the workpiece W through transferring the track of the absolute tool-edge position of the tool-edge on the workpiece W. And the above process is repeated. In this case, not only the deepest position P(n) but also the positions in front and behind of the deepest position P(n) are stored as the machined shape. Further, by removing the section Qb(n−1) stored as a history record of the past shape through the present cutting, the shape information of the removed section Qb(n−1) is updated into a new formed shape information Q(n). As such, the newest machined shape is formed gradually. The newest machined shape consists of the unremoved section Qa(n−1) of the past shape information Q(n−1) and the formed section Q(n) in the present time. Such formed second machined shape is stored as more tiny point data than those of the above first machined shape, or as a continuous line. Thereby, the second machined data can control a surface roughness and the like.

A cutting multiplier storage part 31 stores cutting multipliers Kpc, Kpe, Ktc, Kte, Kfc, and Kfe for calculating the estimated values of the cutting resistance force Fp, Ft, Ff as shown in the formulas (1)-(3). Here, as shown in FIG. 9(a), a principle component force Fp, a back force Ft and a feeding force Ff as respective components of the cutting resistance force are shown. In addition, a preset temporary cutting multipliers Kpc . . . are stored in the cutting multiplier storage part 31. However, if an actual cutting multiplier calculation part 34 calculates an actual cutting multiplier Kpc . . . , the cutting multiplier Kpc . . . is updated. Additionally, the cutting multiplier Kpc in the past . . . can be stored or eliminated.

[Formula 1]

$$Fp = Fpc + Fpe = Kpc \cdot b \cdot h + Kpe \cdot b \quad (1)$$

Fp: Estimated value of the cutting resistance force in the direction of the principal component force Fpc: Cutting force in the direction of the principal component force Fpe: Edge force in the direction of the principal component force Kpc: Cutting multiplier of the cutting force in the direction of the principal component force Kpe: Cutting multiplier of the edge force in the direction of the principal component force b: Cutting length (in the direction of the feeding component force)

h: Actual cutting depth amount

[Formula 2]

$$Ft=Ftc+Fte=Ktc \cdot b \cdot h+Kte \cdot b \qquad (2)$$

Fp: Estimated value of the cutting resistance force in the direction of the back component force Ftc: Cutting force in the direction of the back component force Fte: Edge force in the direction of the back component force Ktc: Cutting multiplier of the cutting force in the direction of the back component force Kte: Cutting multiplier of the edge force in the direction of the back component force b: Cutting length (in the direction of the feeding component force)

h: Actual cutting depth amount

[Formula 3]

$$Ff=Ffc+Ffe=Kfc \cdot b \cdot h+Kfe \cdot b \qquad (3)$$

Ff: Estimated value of the cutting resistance force in the direction of the feeding component force Ffc: Cutting force in the direction of the feeding component force Ffe: Edge force in the direction of the feeding component force Kfc: Cutting multiplier of the cutting force in the direction of the feeding component force Kfe: Cutting multiplier of the edge force in the direction of the feeding component force b: Cutting length (in the direction of the feeding component force)

h: Actual cutting depth amount

Here, in the formulae (1)-(3) for calculating the estimated values of the cutting resistance force Fp, Ft and Ff, the actual cutting depth amount h has been described with reference to FIG. 9(a). Here, the cutting length b will be described with reference to FIG. 9(b). FIG. 9(b) is an A-A sectional view of FIG. 9(a), that is a sectional view taken along the surface of the cutting-edge portion 5a. At this time, as shown in FIG. 9(b), the cutting length b is the length of the cutting-edge portion 5a contacting with the workpiece W in the direction of the feeding component force.

A cutting resistance calculation part 32 calculates the cutting resistance forces Fp, Ft, and Ff based on the formulae (1)-(3), according to the actual cutting depth amount h calculated by the actual cutting depth amount calculation part 23, the cutting length b obtained through machining conditions, and the cutting multipliers Kpc, Kpe, Ktc, Kte, Kfc, Kfe stored in the cutting multiplier storage part 31. Here, as described above, at first the preset temporary cutting multipliers Kpc . . . are stored in the cutting multiplier storage part 31. Thereby, the estimated values of the cutting resistance forces Fp, Ft calculated initially become temporary values. But, when the cutting multiplier storage part 31 stores the updated actual cutting multipliers Kpc . . . , the estimated values of the cutting resistance forces Fp, Ft calculated become ones calculated by means of the actual cutting multipliers Kpc . . . . Furthermore, in the case that the machined shape and the actual cutting depth amount h are varied due to simulating continuously, the cutting resistance calculation part 32 reflects sequentially the variations to calculate the estimated values of the cutting resistance forces Fp, Ft at the next moment. Here, the principal component force Ff, the back component force Ft and the feeding component force Ff are in a relationship with the cutting resistance forces Fx, Fy and Fz in the XYZ directions which can be calculated through coordinate transformation each other.

A cutting resistance force detection sensor 33 detects the actual cutting resistance forces Fx, Fy and Fz in the actual machining. For example, the cutting resistance force detection sensor 33 may be applicable for a load sensor, a displacement sensor, a power consumption detector of a drive motor of the feeding axis, and a supply current sensor and the like. That is, the actual cutting resistance forces Fx, Fy and Fz can be detected directly by the load sensor, or can be detected indirectly by the displacement sensor or others.

An actual cutting multipliers calculation part 34 calculates the actual cutting multipliers Kpc . . . by comparing the estimated values of the temporary cutting resistance forces Fp, Ft and Ff calculated by means of the preset temporary cutting multipliers Kpc . . . stored initially in the cutting multiplier storage part 31 with the actual cutting resistance forces Fp, Ft and Ff which are obtained by the coordinate transformation of the actual cutting resistance forces Fx, Fy and Fz detected by the cutting resistance force detection sensor 33. Here, the cutting multipliers Kpc . . . is varied for various reasons such as the wears of the cutting-edge portions 5a, 5b of the rotation tool 5. However, since the actual cutting multipliers Kpc . . . is calculated by means of the actual cutting resistance forces Fp, Ft and Ff, the actual cutting multipliers Kpc . . . calculated becomes appropriate values corresponding to the current state.

That is, The cutting resistance calculation part 32 utilizes the updated cutting multipliers Kpc . . . to calculate the estimated values of the cutting resistance forces Fp, Ft and Ff. Furthermore, by using the estimated values of the cutting resistance forces Fp, Ft and Ff, actual cutting multipliers calculation part 34 can calculate the actual cutting multipliers Kpc . . . . As such, the cutting multipliers Kpc . . . stored in the cutting multiplier storage part 31 are updated each time and become appropriate values.

Figure 11:
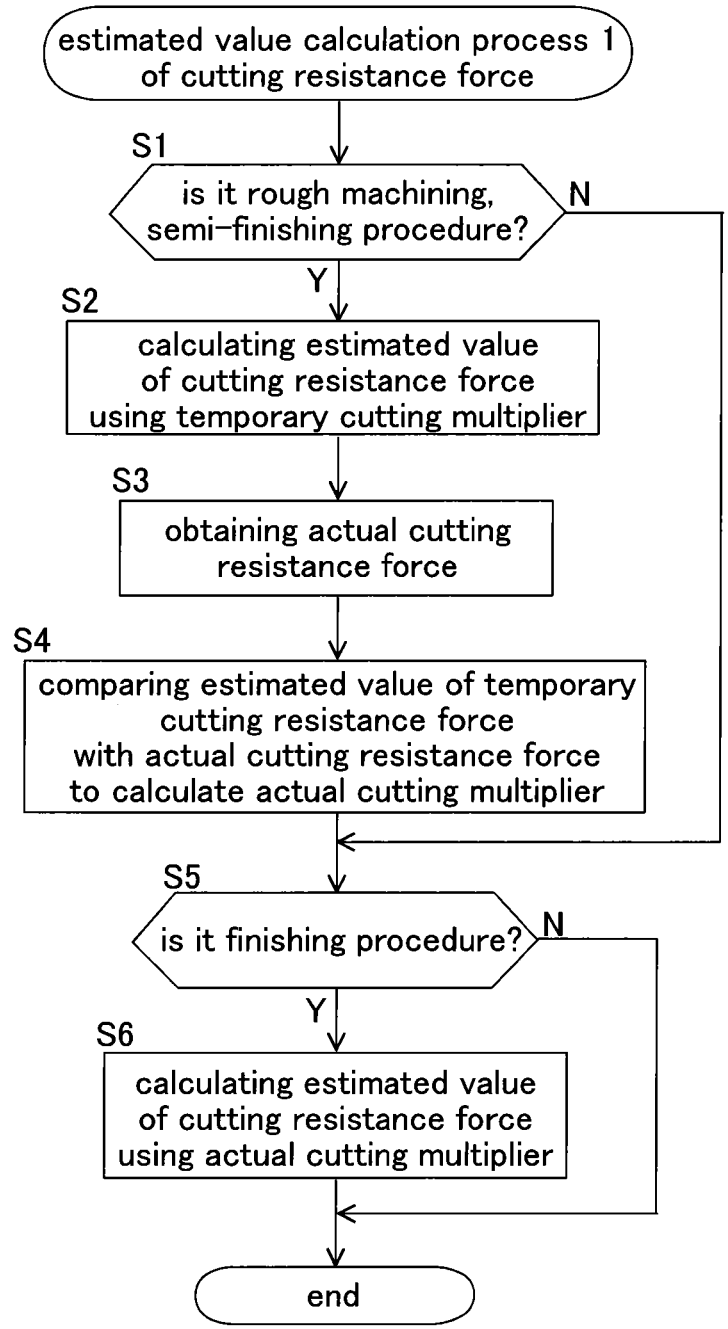
FIG. 11 is a flowchart illustrating a first calculation procedure performed by the cutting resistance force calculation part of FIG. 7.

Here, the calculation process of the estimated values of the cutting resistance forces Fp, Ft and Ff carried out by the cutting resistance calculation part 32 can employ either one of the following ways. They will be described with reference to FIGS. 11 and 12. As a first calculation process, as shown in FIG. 11, it is judged whether the current simulation is a rough machining procedure or a semi-finishing procedure (S1) or not. In the case of the rough machining procedure or the semi-finishing procedure (S1:Yes), the estimated values of the temporary cutting resistance forces Fp, Ft and Ff are calculated by means of the temporary cutting multipliers Kpc . . . (S2). Next, the actual cutting resistance forces Fx, Fy and Fz detected by the cutting resistance force detection sensor 33 are obtained (S3). Next, the actual cutting multipliers Kpc . . . are calculated by comparing the estimated values of the temporary cutting resistance forces Fp, Ft and Ff with the actual cutting resistance forces Fp, Ft and Ff calculated through the actual cutting resistance forces Fx, Fy and Fz (S4).

Next, it is judged whether the current simulation is a finishing procedure or not (S5). The judgment is also performed (S5), even in the case of the current simulation being not a rough machining procedure or a semi-finishing procedure in the judgment of S1. Here, the finishing procedure is a subsequent procedure of the rough machining procedure or the semi-finishing procedure. In addition, in the case of the current simulation being the finishing procedure (S5:

Yes), the estimated values of the temporary cutting resistance forces Fp, Ft and Ff are calculated by using the actual cutting multipliers Kpc . . . calculated. Then the process comes to an end. In the case of employing the calculation process, the estimated values of the cutting resistance force calculated during the finishing procedure can become more precise. In addition, due to not calculating the cutting multipliers Kpc . . . each time, the calculation load does not become large.

Figure 12:
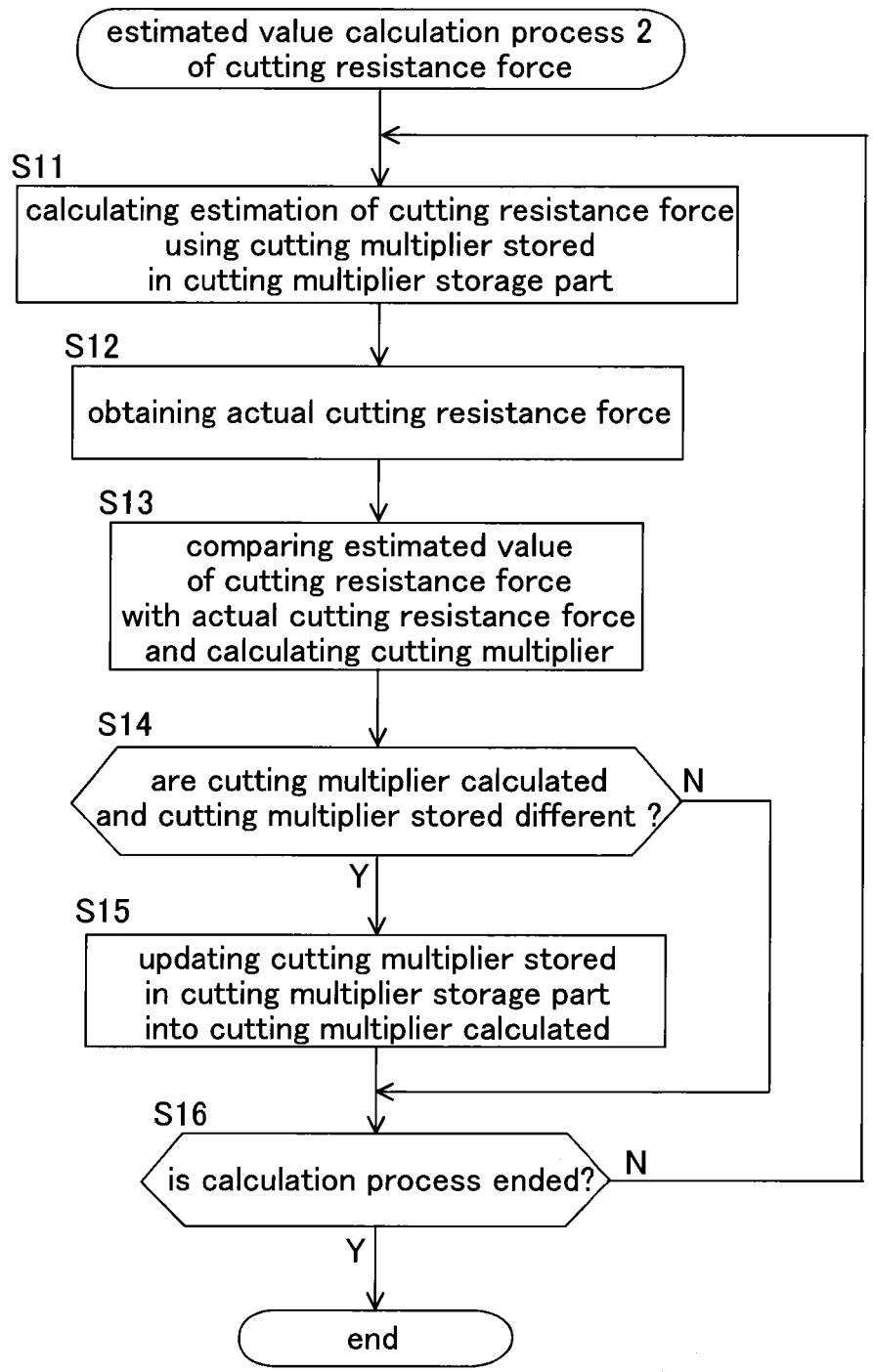
FIG. 12 is a flowchart illustrating a second calculation procedure performed by the cutting resistance force calculation part of FIG. 7.

A second calculation process will be described with reference to FIG. 12. As shown in FIG. 12, the estimated values of the cutting resistance forces Fp, Ft and Ff are calculated by using the temporary cutting multipliers Kpc . . . stored in the cutting multiplier storage part 31 (S11). Initially, the temporary cutting multipliers Kpc . . . are used. Next, the actual cutting resistance forces Fx, Fy and Fz detected by the cutting resistance force detection sensor 33 are obtained (S12). Next, the cutting multipliers Kpc . . . are calculated by comparing the estimated values of the cutting resistance forces Fp, Ft and Ff calculated with the actual cutting resistance forces Fp, Ft and Ff calculated through the actual cutting resistance forces Fx, Fy and Fz (S13).

Next, the cutting multipliers Kpc . . . calculated and the cutting multipliers Kpc . . . stored in the cutting multiplier storage part 31 are compared to determine whether the both are different (S14). In the case of the both being different (S14:Yes), the cutting multipliers Kpc . . . stored in the cutting multiplier storage part 31 are updated into the cutting multipliers Kpc . . . calculated in S13 (S15). On the other hand, in the case of the both being consistent, the updating does not be performed. Then, it is judged whether the calculation of the estimated values of the cutting resistance forces is ended (S16), and if not, then the procedure returns to S11 and the process is repeated.

As such, the estimated values of the cutting resistance forces Fp, Ft and Ff are calculated sequentially by using the cutting multipliers Kpc . . . updated each time through simulation. Thereby, the estimated values of the cutting resistance forces Fp, Ft and Ff can be calculated high-precisely. For example, even if the actual resistance forces are varied with the cutting-edge portions 5a, 5b of the rotation tool 5 worn, the estimated values of the cutting resistance forces Fp, Ft and Ff can also vary in accordance with the change of the actual cutting resistance forces Fp, Ft and Ff.

A tool dynamic property storage part 41 stores a dynamic property coefficient of the rotation tool 5. The dynamic property coefficient includes a mass coefficient M, a viscous resistance coefficient C and an elastic constant K. These dynamic property coefficients M, C and K can be obtained by carrying out a hammer test of the rotation tool 5 in advance, or through simulation, or by taking actual measurements through a sensor arranged on the machine.

A tool center displacement amount calculation part 42 calculates a displacement amount of the rotation center C according to the estimated values of the cutting resistance forces Fp, Ft and Ff calculated by the cutting resistance force calculation part 32 and the dynamic property coefficients M, C and K stored in the tool dynamic property storage part 41. A basic formula used in the calculation of the displacement amount of the rotation center C is referred to a formula (4). In addition, the tool center displacement amount calculation part 42 feeds back the displacement amount of the rotation center C to the tool center coordinate calculation part 12. Thereby, in the case that the cutting resistance forces Fp, Ft and Ff are varied due to simulating continuously, the tool center displacement amount calculation part 42 reflects the respective variations to calculate the displacement amount of the rotation center C. Here, the tool center displacement amount calculation part 42 calculates the amplitude of the vibration of the rotation tool 5.

[Formula 4]

$$\ddot{x}(t) = \frac{F(t) - C \cdot \dot{x}(t) - K \cdot x(t)}{M} \quad (4)$$

$\ddot{x}(t)$: Acceleration at time t
$\dot{x}(t)$: Velocity at time t
$x(t)$: Position at time t
$F(t)$: Cutting resistance force at time t Here, due to the variations of the cutting resistance force Fp, Ft, Ff generated in the rotation tool 5, the displacement amount of the rotation center C is changed. In addition, the displacement amount of the rotation center C is changed due to a vibration phase θ of the rotation tool 5 when received the cutting resistance force Fy during the cutting machining carried out by the rotation tool 5. In more detail, in the case that the phase is defined to be 0° when the rotation tool 5 receives the cutting resistance force at the first time, the displacement amount of the rotation center C is varied according to the vibration phase θ of the rotation tool 5 when the rotation tool 5 receives the cutting resistance force at the second time. Here, the relationship between the vibration phase θ of the rotation tool 5 when received the cutting resistance force Fy and the displacement amount (Ya) of the rotation center in the direction (Y direction) opposite to the cutting depth direction will be described with reference to FIGS. 13-15. Also, as below, the vibration phase θ of the rotation tool 5 when the rotation tool 5 receives the cutting resistance force at the second time is simply termed as "the vibration phase θ".

Figure 13:
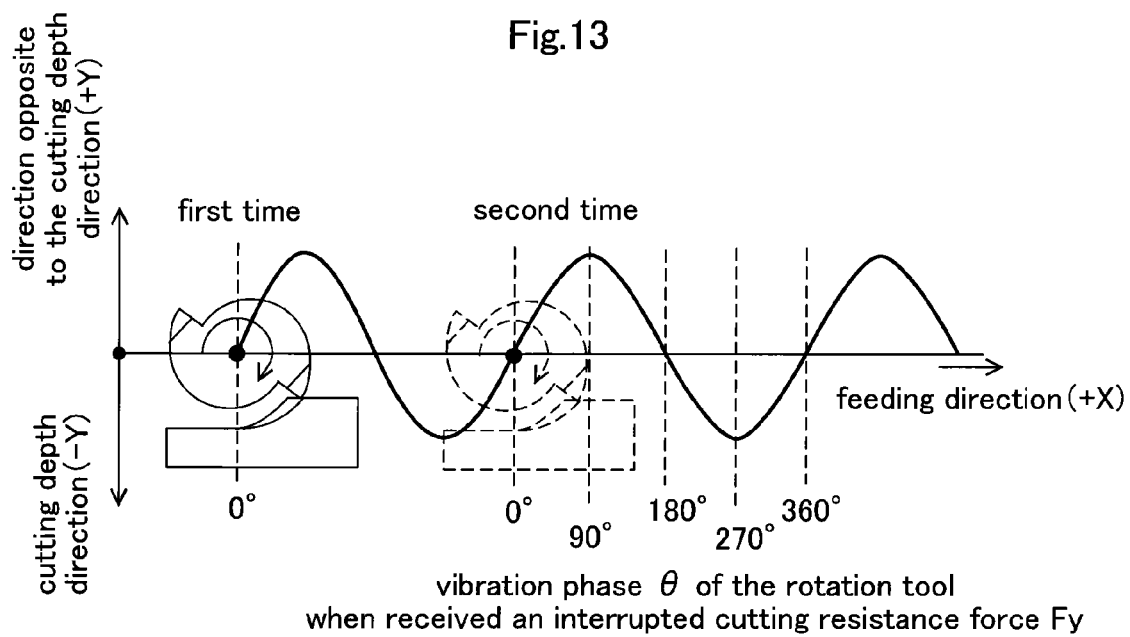
FIG. 13 is an illustration view relevant to a vibration phase of the rotation tool.

At first, as shown in FIG. 13, the rotation tool 5 is set in a state of vibrating in the direction (Y direction) opposite to the cutting depth direction while feeding and moving in the X direction. In addition, the vibration phase θ=0°-360° of the vibration is defined as shown in FIG. 13. That is, the vibration phase θ=0° and 360° are such vibration phases where the rotation tool 5 moves in the direction opposite to the cutting depth direction and the moving velocity in the direction opposite to the cutting depth direction reaches the largest vibration phase. The vibration phase θ=90° is such a vibration phase corresponding to the moment when the rotation tool 5 is switched to the cutting depth direction from the direction opposite to the cutting depth direction. The vibration phase θ=180° is such a vibration phase where the rotation tool 5 moves in the cutting depth direction and the moving velocity in the cutting depth direction reaches the largest. The vibration phase θ=270° is such a vibration phase corresponding to the moment when the rotation tool 5 is switched to the direction opposite to the cutting depth direction from the cutting depth direction.

That is, the vibration phase in a range of θ=0°-90° becomes such a vibration phase where the rotation tool 5 moves in the direction opposite to the cutting depth direction and the moving velocity in the direction opposite to the cutting depth direction is decreased. The vibration phase in a range of θ=90°-180° becomes such a vibration phase where the rotation tool 5 moves in the cutting depth direction and the moving velocity in the cutting depth direction is increased. The vibration phase in a range of θ=180°-270° becomes such a vibration phase where the rotation tool 5 moves in the cutting depth direction and the moving velocity in the cutting depth direction is decreased. The vibration phase in a range of θ=270°-360° becomes such a vibration phase where the rotation tool 5 moves in the direction opposite to the cutting depth direction and the moving velocity in the direction opposite to the cutting depth direction is increased.

Figure 14:
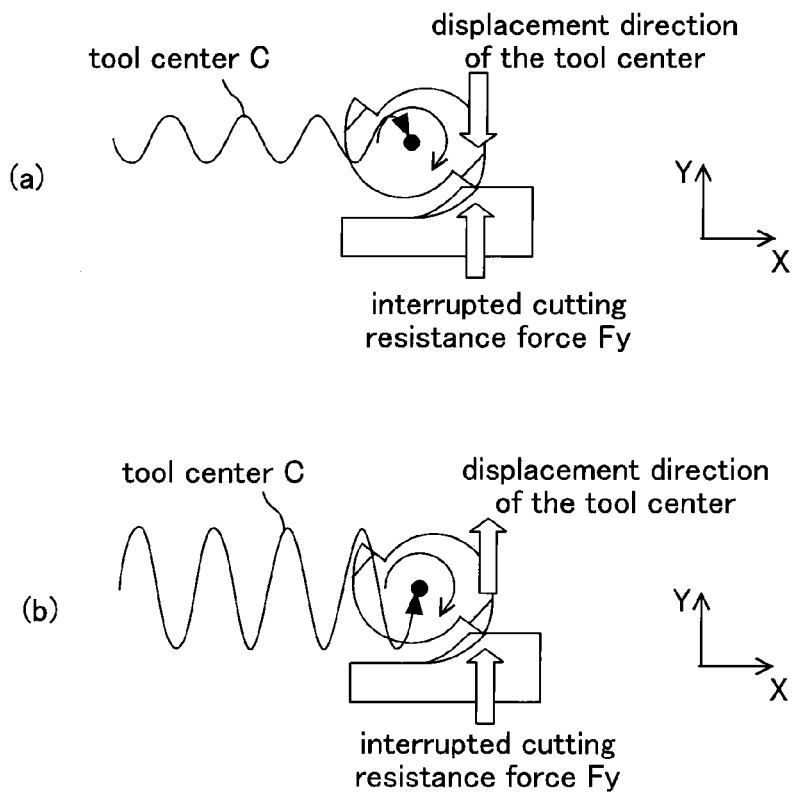
FIG. 14 is a view illustrating the relationship between the vibration state of the rotation center of the rotation tool and the interrupted cutting resistance force generated by the rotation tool and the workpiece.

In addition, with the vibration phase θ=180° and θ=0°, the relationship between the direction of the cutting resistance force Fy received by the rotation tool 5 and the displacement direction of the rotation tool 5 due to the vibration will be described with reference to FIGS. 14(*a*) and 14(*b*). As shown in FIG. 14(*a*), with the vibration phase θ=180°, the direction of the cutting resistance force Fy is opposite to the displacement direction of the rotation tool 5 due to the vibration. On the other hand, as shown in FIG. 14(*b*), with the vibration phase θ=0°, the direction of the cutting resistance force Fy is consistent with the displacement direction of the rotation tool 5 due to the vibration. That is, in the case of FIG. 14(*a*), the cutting resistance force Fy functions in such a way that the amplitude of vibration of the rotation tool 5 is decreased; while in the case of FIG. 14(*b*), the cutting resistance force Fy functions in such a way that the amplitude of vibration of the rotation tool 5 is increased.

In more detail, the relationship between the tool vibration phase θ and the actual cutting depth amount h and the relationship between the tool vibration phase θ and the displacement amount Ya of the rotation center C have been researched respectively, associating with the vibration phase θ=0°, 90°, 170°, 180°, 190° and 270°. The researched results are presented in FIGS. 15(*a*)-15(*f*). Here, the vibration phase θ corresponds to the time from the moment when the rotation tool 5 receives the resistance force at the first time till the moment when the rotation tool 5 receives the resistance force at the second time. Therefore, the vibration phase θ is varied through changing the rotation velocity S (the rotation velocity S of the rotation spindle 4) of the rotation tool 5.

Figure 15:
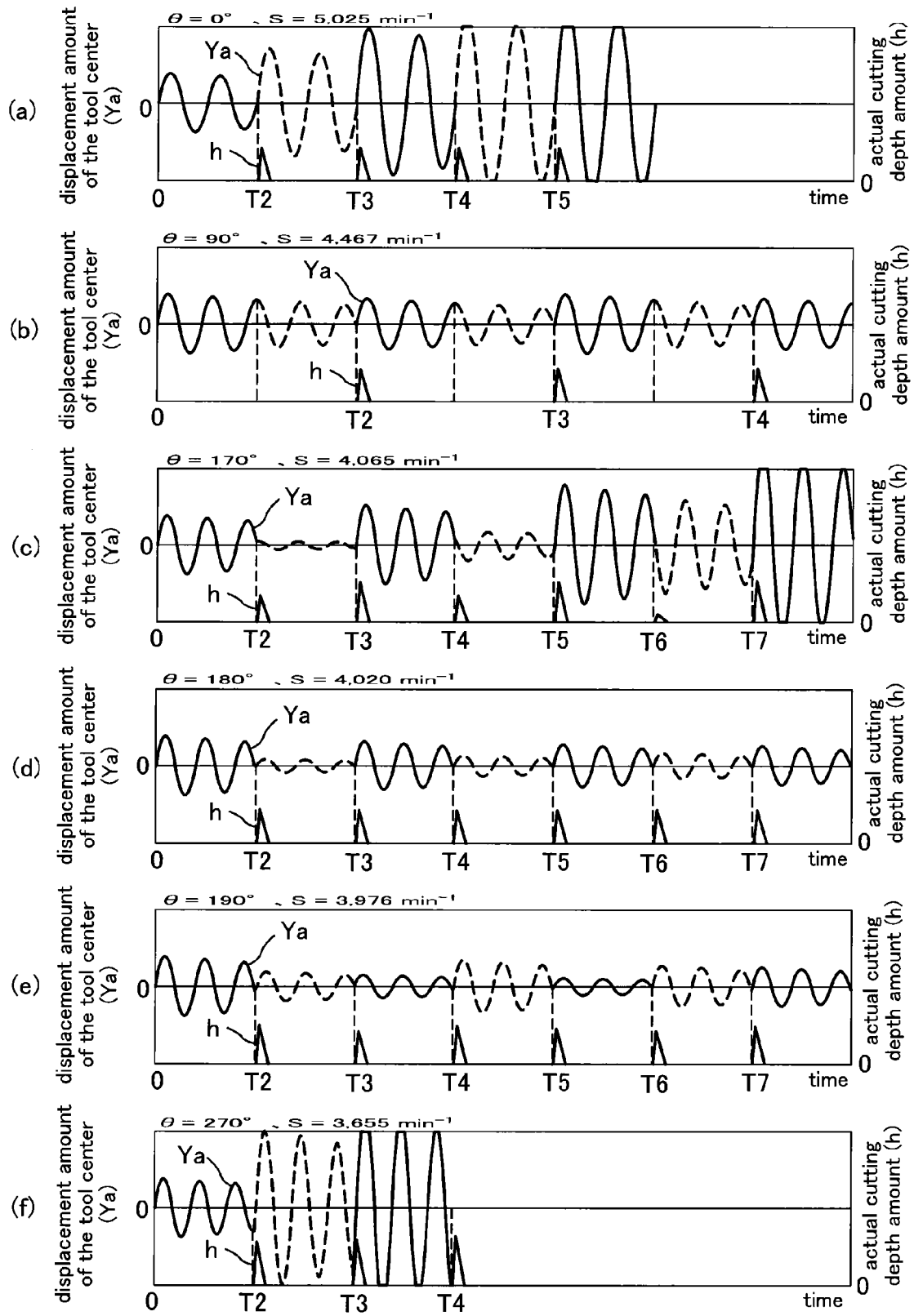
FIG. 15 shows a relationship between the displacement amount of the rotation center of the rotation tool versus the vibration phase of the rotation tool and a relationship between the actual cutting depth amount versus the vibration phase of the rotation tool.

In addition, in the displacement amount Ya of FIGS. 15(*a*)-15(*f*), the solid line represents the change from the state in which the cutting-edge portion 5*a* receives the resistance force till the state in which the cutting-edge portion 5*b* receives the resistance force, and the dotted line represents the change from the state in which the cutting-edge portion 5*b* receives the resistance force till the state in which the cutting-edge portion 5*a* receives the resistance force. In addition, the horizontal axis represents the time, and "0" represents the moment when the rotation tool 5 receives the cutting resistance force at the first time, and "T2" represents the moment when the rotation tool 5 receives the cutting resistance force at the second time. "T3 later" represents the moment when the rotation tool 5 receives the resistance force after the third.

As shown in FIGS. 15(*a*), 15(*c*) and 15(*f*), with the vibration phase θ=0°, 170°, 270°, the displacement amount Ya of the rotation center C diverges. This can be considered as that it is because the cutting resistance force after the second time received by the rotation tool 5 promotes the displacement of the rotation tool 5. On the other hand, with the vibration phase θ=180°, 190°, it can be known that every time the rotation tool 5 receives the cutting resistance force, the cutting resistance force Fy changes the displacement direction of the vibration of the rotation tool 5.

In particular, with the vibration phase θ=180°, it can be known that the displacement amount Ya of the rotation tool 5 is in the state of very close to zero at the moment when the rotation tool 5 receives the cutting resistance force. With the vibration phase θ=190°, it can be known that as compared with θ=180°, the displacement amount Ya of the rotation tool 5 deviates very slightly from zero at the moment when the rotation tool 5 receives the cutting resistance force. Nevertheless, with the vibration phase θ=190°, the vibration of the rotation tool 5 can also be inhibited sufficiently. In addition, with the vibration phase θ=90°, since the displacement amount Ya of the rotation tool 5 is larger at the moment when the cutting-edge portion 5*b* receives the cutting resistance force, no cutting is performed by the cutting-edge portion 5*b*. That is, although the rotation tool 5 has two cutting edge portions, said both function only as one cutting edge, which may bring the possibility of a disadvantageous influence on the precision of the machining surface.

A tool wear amount estimation part 51 estimates wear amounts of the cutting-edge portions 5*a*, 5*b* of the rotation tool 5, according to the estimated values of the cutting resistance forces Fp, Ft, Ff calculated sequentially by the cutting resistance force calculation part 32. Here, in general, if the cutting-edge portions 5*a*, 5*b* of the rotation tool 5 become worn, the cutting resistance forces Fp, Ft, Ff rise. That is, the wear amounts of the cutting-edge portions 5*a*, 5*b* of the rotation tool 5 can be estimated according to the change of the cutting resistance forces Fp, Ft, Ff. Here, the wear amounts of the cutting-edge portions 5*a*, 5*b* of the rotation tool 5 can be estimated by updating sequentially the cutting multiplier Kpc . . . and the estimated values of the cutting resistance forces Fp, Ft, Ff and comparing the past cutting resistance forces Fp, Ft, Ff with the present cutting resistance forces Fp, Ft, Ff. Besides the above, the tool wear amount estimation part 51 can estimate the wear amounts of the cutting-edge portions 5*a*, 5*b* of the rotation tool 5 according to the cutting resistance forces Fp, Ft, Ff detected by the cutting resistance forces detection sensor 34.

A machining error calculation part 61 calculates a machining error of the workpiece W according to a difference between the machined shape of the workpiece W calculated by the machined shape calculation part 24 and the objective shape of the workpiece W. Here, in the case that the machined shape calculation part 24 takes the deepest position P(n) in FIG. 10(*a*) as the machined shape to calculate, the machining error calculation part 61 can calculate a machining error as the cutting remainder. On the other hand, in the case that the machined shape calculation part 24 takes the track in FIG. 10(*b*) as the machined shape to calculate, the machining error calculation part 61 further can calculate a surface roughness besides a machining error as the cutting remainder.

According to the vibration state of the rotation tool 5 and the vibration phase θ of the rotation tool 5 when the rotation tool 5 receives the cutting resistance force Fy at the second time, a rotation velocity decision process part 71 decides the rotation velocity S (the rotation velocity of the rotation spindle 4) of the rotation tool 5 in such a way that the amplitude of vibration of the rotation tool 5 is decreased. It is possible for the rotation velocity decision process part 71 to decide the rotation velocity S and alter the NC data per se, and it is possible to modify the rotation velocity S during the machining. In addition, through enabling to decrease the amplitude of vibration of the rotation tool 5, the effect of preventing a chattering vibration from generating can be obtained.

Figure 16:
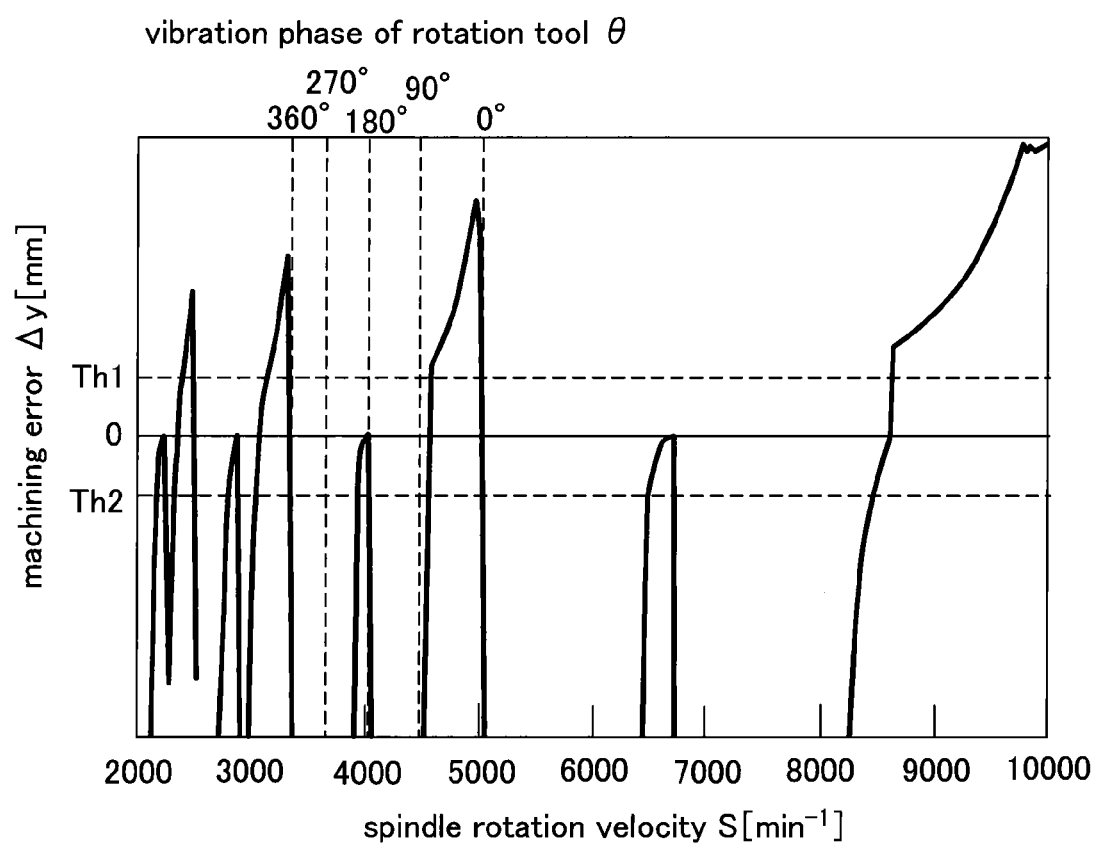
FIG. 16 shows a relationship between a rotation velocity of a rotation spindle and the machining error.
Figure 17:
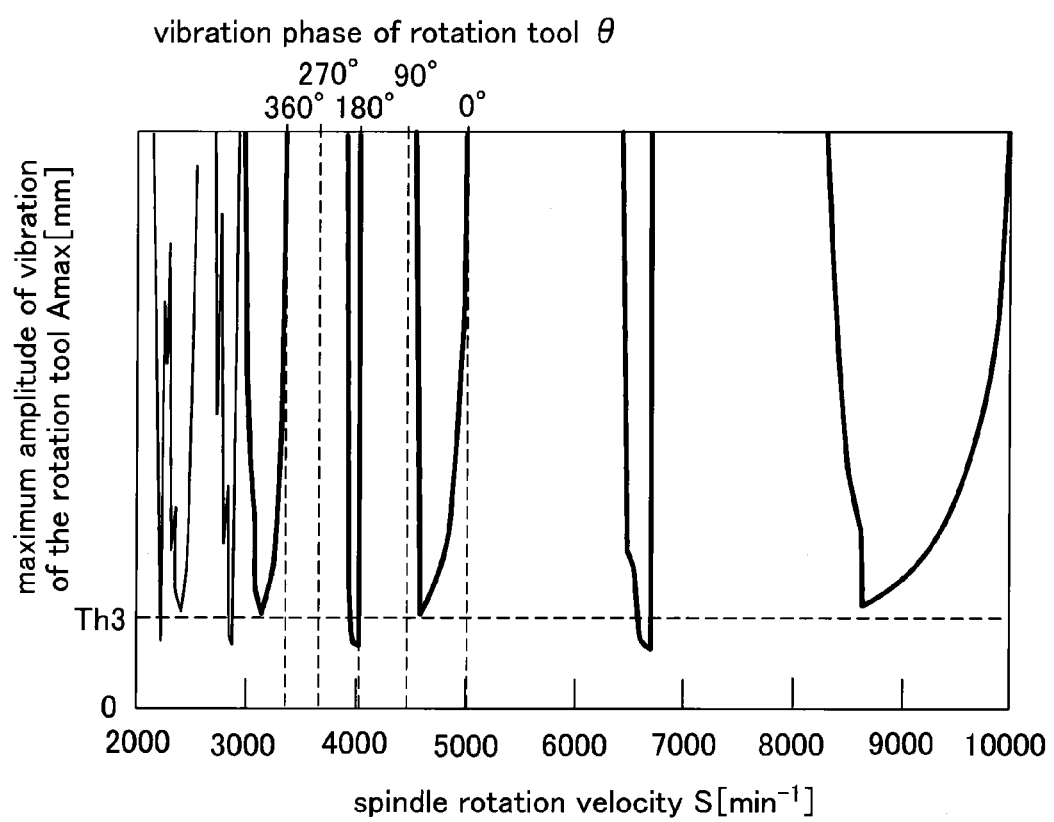
FIG. 17 shows a relationship between the rotation velocity of the rotation spindle and the maximum vibration amplitude of the rotation tool.

With reference to FIGS. 16 and 17, the decision process of the rotation velocity S carried out by rotation velocity decision process part 71 will be described. FIG. 16 shows a relationship between the rotation velocity S of the rotation spindle 4 and a machining error Δy, and FIG. 17 shows a relationship between the rotation velocity S of the rotation spindle 4 and the maximum amplitude Amax of vibration of the rotation tool 5. Additionally, FIGS. 16 and 17 also show the vibration phase θ.

As shown in FIG. 16, in the range of the vibration phase that is equal to or greater than θ=180° and less than θ=270°, the machining error Δy of the cutting remainder is decreased. The reason is the cutting resistance force Fy functions in such a way that the amplitude of vibration of the rotation tool 5 is decreased.

For example, in the case that the machining error Δy is set with an upper limit threshold of Th1 and a lower limit threshold of Th2, it can be known that the range of the vibration phase θ=180° to about 200° can be useful. However, the range between the upper and lower limit threshold varies according to the rigidity of the rotation tool 5 and so on, and thus through improving the rigidity of the rotation tool 5, even the vibration phase close to θ=270°, it is also possible to enable the cutting resistance force Fy to decrease.

In addition, the rotation velocity S of the rotation spindle 4 is set to one corresponding to the vibration phase θ. Here, the rotation velocity S corresponding to the vibration phase θ where the machining error Δy is zero is of course employed, but other vibration phases θ can also be employed, as long as the machining error Δy is within the upper and lower limits. Thereby, through setting appropriately the rotation velocity S, the occurrence of the machining error Δy per se can be decreased.

Furthermore, as shown in FIG. 17, the rotation velocity S can be set in such a way that the maximum amplitude Amax of vibration of the rotation tool 5 becomes equal to or below the set threshold Th3. If the maximum amplitude Amax of vibration of the rotation tool 5 becomes bigger, the rotation tool 5 has a broken risk. However, the rotation velocity S is decided in such a way that the maximum amplitude Amax of vibration of the rotation tool 5 becomes equal to or below the set threshold Th3, so that the rotation tool 5 can be reliably prevented from breaking, and meanwhile the machining error Δy is decreased. As shown in FIG. 17, it can be seen that the vibration phase θ where the maximum amplitude Amax of vibration of the rotation tool 5 becomes equal to or below the set threshold Th3 is in a range of θ=180° to about 200°. Nevertheless, the range equal to or below the set threshold Th3 varies according to the rigidity of the rotation tool 5 and so on, and thus through improving the rigidity of the rotation tool 5, even the vibration phase close to θ=270°, it is also possible to enable the maximum amplitude Amax to decrease.

A mechanical control part 73 controls respective drive parts 74 according to NC data. In particular, the mechanical control part 73 controls the rotation velocity of the rotation spindle 4, based on the rotation velocity S of the NC data decided by the rotation velocity decision process part 71.

A correction part 72 corrects the machining conditions based on the machining error Δy calculated by the machining error calculation part 61. In addition, in the case of the rotation velocity S decided by rotation velocity decision process part 71, the correction part 72 makes correction in a manner of becoming the rotation velocity S. Furthermore, if the maximum amplitude Amax of vibration of the rotation tool 5 calculated by the tool center displacement amount calculation part 42 exceeds the set threshold Th3, the correction part 72 corrects a rotation velocity S in a manner of becoming the set threshold Th3.

Further, besides the above, the correction part 72 can also correct a command value to alter the cutting remainder Rd in the cutting depth direction or the feeding velocity. For example, through decreasing the cutting remainder Rd of the cutting depth direction or the feeding velocity, the displacement amount of the rotation center C of the rotation tool 5 can be reduced. As a result, the machining error can be decreased. In addition, the correction part 72 can also alter the change itself of the command position, in order to decrease the machining error.

The machining system according to the above description has the following effects. In the interrupted cutting carried out by the rotation tool 5, during one rotation of the rotation tool 5, according to the difference of the phases of cutting edge portion 5a, 5b of the rotation tool 5, there exist the moment carrying out cutting and the moment idling without cutting. Therefore, the displacement amount of the rotation center C of the rotation tool 5 is not necessary to be directly the machining error. Furthermore, even during the period the rotation tool 5 takes another rotation cycle and carries out cutting, the cutting resistance forces Fp, Ft, Ff may also be altered.

Here, in addition to the displacement amount of the rotation center C of the rotation tool 5, with the relative positions of the cutting edge portions 5a, 5b taken into consideration, the absolute tool-edge positions of the cutting edge portions 5a, 5b relative to the workpiece W are thereby calculated. That is, during one rotation of the rotation tool 5, the tendency of the absolute tool-edge position can be grasped high-precisely. In addition, through transferring the absolute tool-edge position on the workpiece W, the shaped shape of the workpiece W can be calculated, and thus the machined shape can be calculated high-precisely. By using the difference between the machined shape calculated in this way and the objective shape, the machining error can be calculated. Thereby, the machining error is calculated high-precisely through analysis.

In addition, in the range of phase where the cutting-edge portions 5a, 5b of the rotation tool 5 cuts the workpiece W, the absolute tool-edge positions of the cutting-edge portions 5a, 5b can be grasped continuously. Thereby, in the respective range of phase where the cutting is carried out, the positions where the absolute tool-edge positions of the cutting-edge portions 5a, 5b are located can be grasped. Thereby, the machining error can be calculated more precisely. Also, the absolute tool-edge positions of the cutting-edge portions 5a, 5b are not grasped continuously, but simply, only the absolute tool-edge positions of the cutting-edge portions 5a, 5b at several moments, such as the moment of the rotation phase ϕ=90° of the rotation tool 5, can be grasped. In general, since the rotation phase ϕ=90° is in the vicinity of the deepest position, although simple, it is enough to be applied.

In addition, through taking the dynamic properties of the rotation tool 5 into consideration, the displacement amount of the rotation center C of the rotation tool 5 in accordance with the change of the cutting resistance force Fp, Ft, Ff generated by the rotation tool 5 can be calculated high-precisely. As a result, the machined shape can be calculated high-precisely, and meanwhile the machining error can be calculated high-precisely. Further, due to being the interrupted cutting, the rotation tool vibrates by the interrupted cutting resistance force Fy generated at the moment the cutting-edge portions 5a, 5b start to cut. In addition, since the displacement amount of the rotation center C of the rotation tool 5 can be calculated according to the grasped vibration state of the rotation tool 5, the displacement amount of the rotation center C of the rotation tool can be calculated high-precisely. As a result, the machined shape can be calculated high-precisely, and meanwhile the machining error can be calculated high-precisely.

In addition, the displacement amount Ya of the rotation center C of the rotation tool 5 in the direction opposite to the cutting depth direction is prone to become big, compared with the displacement amount in the other directions. Further, the displacement amount Ya of the rotation center C of the rotation tool 5 in the direction opposite to the cutting depth direction has the greatest influence on the machined shape. Therefore, through grasping at least the displacement amount Ya of the rotation center C of the rotation tool 5 in the direction opposite to the cutting depth direction, the machined shape can be calculated high-precisely, and meanwhile the machining error can be calculated high-precisely. Here, in the above embodiments, for all of the direction (Y direction) opposite to the cutting depth direction, the feeding direction (X direction) and the Z-axis direction, the displacement amount of the rotation center C is calculated, and the machining error is calculated. Thereby, the machining error can be calculated high-precisely. Nevertheless, besides that, from the view of the influence degree, it can be applied to only the direction (Y direction) opposite to the cutting depth direction.

In addition, in calculating the cutting resistance forces Fp, Ft, Ff, the displacement amount of the rotation center C of the rotation tool 5 can be fed. That is, the calculation of the displacement amount of the rotation center C of the rotation tool 5 and the calculation of the cutting resistance forces Fp, Ft, Ff apply coupling analysis. Here, at the next moment after the rotation tool 5 has displaced, the cutting resistance forces Fp, Ft, Ff are varied due to the displacement. Corresponding to the cutting resistance forces Fp, Ft, Ff varying, the rotation center C of the rotation tool 5 is further displaced. As such, the cutting resistance forces Fp, Ft, Ff of the rotation tool 5 and the displacement of the rotation center C of the rotation tool 5 are associated with each other. Therefore, through coupling-analysis, the displacement amount of the rotation center C of the rotation tool 5 can be calculated high-precisely. As a result, the machining error can be calculated high-precisely.

In calculating the present cutting resistance forces Fp, Ft, Ff, the shape history record of the machined shape in the past is used. Thereby, the present cutting resistance forces Fp, Ft, Ff can be calculated high-precisely, and as a result, the displacement amount of the rotation center C of the rotation tool 5 be calculated high-precisely. That is, the machining error can be calculated high-precisely.

In addition, in the above embodiments, the machining simulation apparatus serving as a part of the machining system is composed of the cutting resistance force calculation part 32 and the functional parts associated with the same. In addition, the machining error calculation apparatus serving as another part of the machining system is composed of the machining error calculation part 61 and the functional parts associated with the same. In addition, the machining control apparatus serving as yet another part of the machining system is composed of a mechanical control part 73 and the functional parts associated with the same In addition, in the above embodiments, the case that is applicable to make correction in controlling the actual machine tool and the case of making NC data have been described. Besides that, it may be possible not to make NC data, but make correction in an actual control of the machine tool. In this case, the machine tool has a cutting resistance force detection sensor 33, and makes correction to the rotation velocity S, the cutting remainder Rd in the cutting depth direction, the feeding velocity and so on through the correction part 72. In addition, there may are applicable for only making NC data.

In addition, in the above embodiments, the functional constructional parts of the machining system have been described, yet the process performed by respective constructional parts can be grasped as a procedure. In this case, they can be grasped as a process method performed by the machining system. That is, the process performed by respective constructional parts serving as the machining simulation apparatus can be grasped as a machining simulation method. In addition, the process performed by respective constructional parts serving as the machining error calculation apparatus can be grasped as a machining error calculation method. In addition, the process performed by respective constructional parts serving as the machining control apparatus can be grasped as a machining control method.

REFERENCE SIGNS LIST

5 Rotation Tool;
5a,5b Cutting-edge portion;
14 Relative Tool-edge Position Calculation Part;
15 Absolute Tool-edge Position Calculation Part;
24 Machined shape Calculation Part;
42 Tool Center Displacement Amount Calculation Part;
61 Machining Error Calculation Part;
C Rotation Center;
W Workpiece.

What is claimed is:

1. A machining control apparatus for interrupted cutting, said interrupted cutting using a rotation tool which is provided with one or more cutting edge portions in a circumferential direction on a peripheral circumference thereof, the interrupted cutting being carried out in such a way that the rotation tool is rotated around its axis while moved relatively with respect to a workpiece, the machining control apparatus comprising:
   a rotation velocity decision process unit configured to decide a rotation velocity of the rotation tool in such a way that an amplitude of vibration of the rotation tool is decreased, based on a vibration state of the rotation tool and a vibration phase of the rotation tool when the rotation tool receives a cutting resistance force, in a case that the rotation tool vibrates due to an interrupted cutting resistance force generated in the rotation tool during the interrupted cutting; and
   a rotation velocity control unit configured to control the rotation velocity of the rotation tool based on the rotation velocity decided by the rotation velocity decision process unit.

2. The machining control apparatus according to claim 1, wherein
   the rotation velocity decision process unit decides the rotation velocity based on an absolute tool-edge position of the cutting-edge portion with respect to the workpiece.

3. The machining control apparatus according to claim 1, wherein
   the rotation velocity decision process unit decides the rotation velocity in such a way that a maximum amplitude of vibration of the rotation tool becomes equal to or below a set threshold.

4. The machining control apparatus according to claim 1, wherein
   the vibration phase is defined as 0° when the rotation tool receives the cutting resistance force at a first time, the rotation velocity decision process unit decides the rotation velocity in such a way that when the rotation tool receives the cutting resistance force at a second time, the vibration phase of the rotation tool is equal to or greater than 180° and less than 270°.

5. The machining control apparatus according to claim 1, comprising an amplitude detection unit configured to detect the amplitude of vibration of the rotation tool; and a rotation velocity correction unit configured to correct the rotation velocity in such a way that the amplitude of vibration of the rotation tool becomes equal to or below a set threshold, in case that the amplitude of vibration of the rotation tool detected by the amplitude detection unit exceeds the set threshold.

6. A machining control method for interrupted cutting, said interrupted cutting using a rotation tool which is provided with one or more cutting edge portions in a circumferential direction on a peripheral circumference thereof, being carried out in such a way that the rotation tool is rotated around its axis while moved relatively with respect to a workpiece, the machining control method comprising:

a rotation velocity decision step for deciding a rotation velocity of the rotation tool in such a way that an amplitude of vibration of the rotation tool is decreased, based on a vibration state of the rotation tool and a vibration phase of the rotation tool when the rotation tool receives a cutting resistance force, in a case that the rotation tool vibrates due to an interrupted cutting resistance force generated in the rotation tool during the interrupted cutting; and a rotation velocity control step for controlling the rotation velocity of the rotation tool based on the rotation velocity decided in the rotation velocity decision step.

* * * * *